(12) United States Patent
Grace

(10) Patent No.: US 7,017,272 B2
(45) Date of Patent: Mar. 28, 2006

(54) WEED AND GRASS TRIMMER

(76) Inventor: Albert S. Grace, Grace Roofing, 12933 Schoolhouse Dr., Lowell, AR (US) 72745

( * ) Notice: Subject to any disclaimer, the term of this patent is extended or adjusted under 35 U.S.C. 154(b) by 0 days.

(21) Appl. No.: 10/747,160

(22) Filed: Dec. 30, 2003

(65) Prior Publication Data

US 2004/0148784 A1 Aug. 5, 2004

Related U.S. Application Data

(62) Division of application No. 09/564,949, filed on May 5, 2000.

(60) Provisional application No. 60/148,321, filed on Aug. 11, 1999.

(51) Int. Cl.
*A01D 34/416* (2006.01)
*A01D 34/68* (2006.01)
*A01G 3/00* (2006.01)
*B26B 27/00* (2006.01)

(52) U.S. Cl. .......................... 30/275.4; 30/276; 30/347; 56/12.7

(58) Field of Classification Search .................. 30/276, 30/347, 275.4, 277.4; 56/12.7, 12.5, 255, 56/295
See application file for complete search history.

(56) References Cited

U.S. PATENT DOCUMENTS

| | | | |
|---|---|---|---|
| 4,118,864 A | 10/1978 | Pittinger, Sr. et al. | 30/276 |
| 4,131,997 A | 1/1979 | Utter | 30/276 |
| 4,134,204 A | 1/1979 | Perdue | 30/276 |
| 4,136,446 A | 1/1979 | Tripp | 30/276 |
| 4,209,902 A | 7/1980 | Moore et al. | 30/276 |
| 4,211,004 A | 7/1980 | Woods | 30/276 |
| 4,211,005 A | 7/1980 | Woods | 30/276 |
| 4,265,019 A | 5/1981 | Kilmer | 30/276 |
| 4,281,505 A | 8/1981 | Fuelling, Jr. et al. | 30/276 X |
| 4,285,128 A | 8/1981 | Schnell et al. | 30/276 |
| 4,310,970 A | 1/1982 | Evenson et al. | 30/276 |
| 4,426,780 A | 1/1984 | Foster | 30/276 |
| 4,633,588 A | 1/1987 | Pittinger, Jr. | 30/347 |
| 4,738,085 A | 4/1988 | Nishio et al. | 30/276 X |
| 4,813,140 A | 3/1989 | Calcinai | 30/276 |
| 5,060,384 A | 10/1991 | Everts | 30/276 |
| 5,109,607 A | 5/1992 | Everts | 30/276 |
| 5,339,526 A | 8/1994 | Everts | 30/276 |
| 5,414,934 A | 5/1995 | Schlessmann | 30/276 X |
| 5,566,455 A | 10/1996 | Hagstrom | 30/276 |
| 5,659,960 A | 8/1997 | Everts et al. | 30/276 |
| 5,743,019 A | 4/1998 | Berfield | 30/276 |
| 5,768,786 A | 6/1998 | Kane et al. | 30/276 |
| 6,094,823 A | 8/2000 | Brown et al. | 30/276 |

FOREIGN PATENT DOCUMENTS

DE 2832649 2/1979
WO WO 81/03106 11/1981

*Primary Examiner*—Clark F. Dexter
(74) *Attorney, Agent, or Firm*—Richard C. Litman

(57) ABSTRACT

A weed and grass trimmer has a cutting line which is fed as the weed trimmer is in use. The weed trimmer's cutting head includes a spool for cutting line, and a housing. The spool has flanges around its circumference, which may engage a corresponding upper or lower set of flanges in the housing. Actuation of a control located near the handle operates either a cable or a solenoid, causing the spool to reciprocate between the upper and lower flanges. The difference in centrifugal force and angular velocity during this reciprocation causes additional cutting line to be fed.

1 Claim, 26 Drawing Sheets

WEED AND GRASS TRIMMER

CROSS-REFERENCE TO RELATED APPLICATIONS

This application is a division of application Ser. No. 09/564,949, filed May 5, 2000, which claims the benefit of U.S. Provisional Patent Application Ser. No. 60/148,321, filed Aug. 11, 1999.

BACKGROUND OF THE INVENTION

1. Field of the Invention

The present invention relates to cutting line feeders for weed and grass trimmers. More specifically, the invention is a cutting line feeder wherein pulling an actuation lever while operating the weed trimmer moves corresponding flanges on the spool and spool housing into and out of alignment, so that the difference in centrifugal force and angular velocity feeds additional cutting line.

2. Description of Related Art

Weed and grass trimmers having a cutting wire spinning in a horizontal plane are commonly used to trim grass in locations where a lawnmower cannot reach or would be inconvenient. The cutting wires used with such weed trimmers are designed to minimize injury in the event a spinning wire comes in contact with a person. Such cutting wires frequently break and/or wear during use, necessitating a means for feeding additional wire.

Several inventors have proposed various means for feeding additional wire as the weed trimmer is in operation, thereby saving time. A common proposal has been a cutting head having a spool and housing which rotate incrementally with respect to each other when the ground is struck with the cutting head. However, this solution risks damaging the weed trimmer. No one within the knowledge of the present inventor has proposed a feed mechanism actuated by a lever near the handle of the weed trimmer, actuating either a cable or solenoid mechanism for causing a difference in centrifugal force and angular velocity between the spool and spool housing, thereby feeding additional wire.

U.S. Pat. No. 4,118,864, issued to Charles B. Pittinger, Sr. et al. on Oct. 10, 1978, describes an incremental feed means for a weed trimmer. The trimmer includes a worm pinion mounted coaxially on top of a hollow shaft, and a plurality of spools mounted on horizontal axes, with the spools having gears engaging the worm pinion. A friction bar is positioned so that it can engage the upper portion of the worm pinion. The wire passes from the spools, between the worm pinion and hollow shaft, and down the hollow shaft, with the friction between the pinion and hollow shaft securing the wire in place. Engaging the worm pinion with the friction bar prevents it from turning with the rest of the assembly, causing it to rise, releasing the wire, so that centrifugal force pulls additional wire out. When the worm gear reaches a height wherein the friction bar is adjacent to a reduced diameter portion, the friction bar can no longer engage the work gear, so it falls back into place and continues to rotate, stopping the dispensing of wire.

U.S. Pat. No. 4,136,446, issued to Dwight E. Tripp on Jan. 30, 1979, describes a vegetation cutter having a mechanical line feed. A button on the handle is depressed, pushing a brake plate against a control ring, which is in turn pressed against a brake plate. The control ring is thereby angularly displaced. The control ring is linked to a ratchet engaging the spool. The ratchet moves from a first position to a second position, allowing the spool to rotate incrementally, dispensing a measured amount of additional wire.

U.S. Pat. No. 4,211,004, issued to Donald M. Woods on Jul. 8, 1980, describes a weed cutter with a mechanical line feed. The spool includes a gear having a Maltese cross configuration. The actuator is a round member having a shoulder portion with two opposing convex surfaces and two opposing concave surfaces. A pair of opposing pins are outside the actuator. The convex portion engages the Maltese cross to prevent movement of the spool. Rotation of the actuator brings the concave portion adjacent to the Maltese cross, allowing space for movement, while simultaneously bringing a pin within a slot on the Maltese cross, rotating the spool.

U.S. Pat. No. 4,265,019, issued to Lauren G. Kilmer on May 5, 1981, describes a vegetation trimmer having a filament which twists and untwists as it moves within a horizontal plane, thereby presenting changing cutting surfaces to the vegetation, resulting in even wear.

U.S. Pat. No. 4,285,128, issued to John W. Schnell et al. on Aug. 25, 1981, describes a spool feed mechanism for a grass trimmer. The spool has a ratchet wheel on each end, with the teeth offset from each other. A U-shaped member alternately engages and disengages the ratchet wheels, allowing the centrifugal force of the spinning end of the wire to pull additional measured increments of wire from the spool.

U.S. Pat. No. 4,633,588, issued to Charles B. Pittinger, Jr., on Jan. 6, 1987, describes a bump-feed filament vegetation trimmer. Several methods of feeding the filament are described. In some embodiments, a spool and housing spin together, with the housing having a series of upper and lower internal flanges corresponding to a series of flanges on the spool. In one embodiment, bumping the spool on the ground drives the spool from the lower to the upper flanges, with the friction slowing the rotation of the spool, so that the spool and housing rotate with respect to each other until the spool engages the upper flanges. Removing the spool from contact with the ground allows a spring to push the spool back towards the lower flanges, causing another increment of rotation. Another embodiment includes a fork for pushing the housing towards the spool, again causing the upper and lower flanges to sequentially engage the spool, allowing an increment of wire to be dispensed. In a third embodiment, the driveshaft includes a plunger having a large diameter portion and smaller diameter portion pushes a pair of balls against the spool, so that the driveshaft thereby engages the spool. Upward pressure on the plunger causes the reduced diameter portion to move adjacent to the balls, thereby momentarily disengaging the spool and driveshaft.

U.S. Pat. No. 5,109,607, issued to Robert G. Everts on May 5, 1992, describes an automatic line trimmer head. An indexer cam on top of the spool includes a plurality of ramps along its outer edge, and a plurality of voids on its top surface. The ramps engage a plurality of followers on the inner surface of the housing. When sufficient wire is in use, the centrifugal force of the wire drives the indexer cam against the followers, causing it to move upwards where the voids engage a plurality of stop blocks. When the centrifugal force decreases due to wire breaking away, the indexer cam and spool travel downward within the housing, disengaging the indexer cam from the stop blocks, and allowing more wire to be dispensed.

U.S. Pat. No. 5,566,455, issued to Leonard Hagstrom on Oct. 22, 1996, describes a rotary filament vegetation trimmer with an air cooled filament. The head is shaped to form a centrifugal air pump, which rapidly increases the volume available for the air to provide refrigeration. The refrigerated air is directed towards bends in the wire, where the wire is most likely to fail.

U.S. Pat. No. 5,659,960, issued to Robert G. Everts et al. on Aug. 26, 1997, describes a line trimmer head having a ratchet to prevent spool rotation in the wrong direction during winding of wire around the spool.

U.S. Pat. No. 5,743,019, issued to Robert C. Berfield on Apr. 28, 1998, describes a line feed for a rotary wire trimmer. The line is wound around a large diameter spool, then a smaller diameter spool, then extends outward to form a cutting surface. When the end breaks off, centrifugal force causes additional wire to extend outward until equilibrium is reached.

U.S. Pat. No. 5,768,786, issued to Steven F. Kane et al. on Jun. 23, 1998, describes a brush cutting device having a handle which, when released, causes a brake to stop the rotation of the cutter and a cover to completely enclose the cutter.

German Pat. No. 2,832,649, published on Feb. 1, 1979, describes a mowing device having a wire which is fed by centrifugal force.

International Pat. App. No. WO 81/03106, published on Nov. 12, 1981, describes a vegetation cutter using an eccentric pivot to extend cutting line by centrifugal force as the cutting line shortens.

None of the above inventions and patents, taken either singly or in combination, is seen to describe the instant invention as claimed.

SUMMARY OF THE INVENTION

The invention is a weed and grass trimmer having a line feeder actuated by a control adjacent to the handle, and which is operated during use of the grass trimmer. Although there are several different embodiments of the line feed mechanism, the basic structure includes a weed trimmer head having a spool for cutting line and a housing. The spool has a series of external flanges, and the housing has upper and lower groups of internal flanges corresponding to the external flanges of the spool. The upper flanges are offset from the lower flanges so that each upper flange is centered between two lower flanges. The spool is attached to the weed trimmer's drive shaft, while the housing spins freely.

The spool typically engages the lower flanges of the housing. When it is necessary to extend additional cutting line, the housing and spool are brought together, either by raising the spool or lowering the housing, so that the spool engages the upper flanges of the housing. The result is a brief difference in centrifugal force and angular velocity between the spool and the housing, and the housing will rotate until the offset upper flanges engage the spool's flanges, thereby dispensing a first small increment of cutting line. The housing and spool are then allowed to return to their normal positioning. As the spool moves from the upper to the lower flanges of the housing, there is once again a brief period of time wherein there is a difference between the centrifugal force and angular velocity of the spool and housing. The spool and housing once again rotate relative to each other until the housing's lower flanges again engage the spool's flanges, thereby dispensing a second increment of wire.

There are different methods of causing the spool and housing to move relative to each other, depending on whether the weed trimmer is a cable drive, curved boom gasoline powered type, driveshaft driven, straight boom gasoline powered type, or electrically powered. The basic apparatus for moving the housing and spool relative to each other may be either a lever-actuated cable, or a solenoid, either of which may be interchanged with the other.

One preferred embodiment, which may be used with any type of weed trimmer regardless of drive type or motor type, uses a fork to push the housing down towards the spool when additional line must be extended. The fork is operated by a cable extending along the weed trimmer's boom, connecting at its upper end to a lever near the handle. The lever is pivotally attached to the boom, and the cable is attached to the lever near its upper end, so that squeezing the lever towards the boom pushes the housing towards the spool.

Alternatively, a weed trimmer having a straight boom and drive shaft may utilize a line feed mechanism wherein the spool is pulled upward towards the housing. Typically, the housing will be rotatably connected to the driveshaft, with the spool rotating freely. A shaft passing through the hollow driveshaft connects to the bottom end of the spool, with the upper end of the shaft having a bearing abutting a lever. A cable extends from the lever to a hand lever adjacent to the handle, The hand lever is pivotally mounted near its base, and the cable is attached to the hand lever well away from the boom, so that squeezing the hand lever will pull the cable. The cable in turn operates the lever, raising the shaft and spool, causing the spool to sequentially engage the upper and lower flanges within the housing. The spool thereby rotates with respect to the housing, dispensing two small increments of cutting line.

In either of the above embodiments, a solenoid may be used instead of a cable to actuate the line feed mechanism. The solenoid's reciprocating member takes the place of the fork, becoming the plunger which pushes the housing towards the spool, or which actuates the lever raising the spool towards the housing. A normally open push button is located adjacent to the handle for controlling electricity flow to the solenoid. Electrical power is supplied either by the weed trimmer's electric motor, or by the electrical system of the gasoline engine. Pushing the button allows electricity to flow to the solenoid's electromagnet, drawing the plunger into the magnet, pushing on either the housing or the lever actuating the spool. Releasing the button cuts off the flow of electricity, thereby allowing the spool and housing to return to their normal position.

The weed trimmer may use an interchangeable, universal bobbin to hold the cutting line, forming part of the spool. Preferably, the permanent portion of the spool will include a plate having circumferential flanges, and will engage the bobbin with corresponding teeth, so that the bobbin and flange plate spin together.

Also, parts that otherwise would be exposed to the elements are covered by a brush shield and a dust and dirt shield or cover so as to assure uninterrupted operation of the invention in the dust and/or dirt and brush environment of use of the invention.

In use, the user merely uses the weed trimmer in the conventional manner until additional cutting line must be dispensed. The user may then dispense the required additional cutting line without stopping the weed trimmer, or even stopping the trimming operation. Merely squeezing the lever or pushing the button pushes the housing towards the spool, or pulls the spool towards the housing. The spool disengages from the housing's lower flanges, rotates a small increment with respect to the housing, dispensing a first small increment of cutting line, and engages the upper flanges in the housing. Releasing the button or lever allows the housing to raise, or the spool to lower, so that the spool disengages from the housing's upper flanges, rotates a small increment relative to the housing, thereby dispensing a second small increment of cutting line, until engaging the lower flanges of the housing.

Several embodiments of the line feed mechanism may be installed on existing weed trimmers without substantial difficulty. The cutting head of an existing weed trimmer can be replaced with one having the appropriate spool and housing. The fork or solenoid to push the housing towards the spool may be attached to the outside of the cutting head. The cable, electrical wiring, and actuating handle or button may be attached to the outside of the boom.

Accordingly, it is a principal object of the invention to provide a cutting line feed mechanism for a weed trimmer which may be operated from the weed trimmer's handle without stopping the cutting operation.

It is another object of the invention to provide a cutting line feed mechanism for a weed trimmer which may be added to existing weed trimmers with minimal difficulty.

It is a further object of the invention to provide a cutting line feed mechanism for a weed trimmer which avoids the necessity of striking the ground with the weed trimmer to feed additional line, thereby preventing damage to the weed trimmer.

It is still another object of the invention to provide a cutting line feed mechanism for a weed trimmer with protective cover or shield elements to protect parts from the dust and debris-laden environment common to the area of use of the invention.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
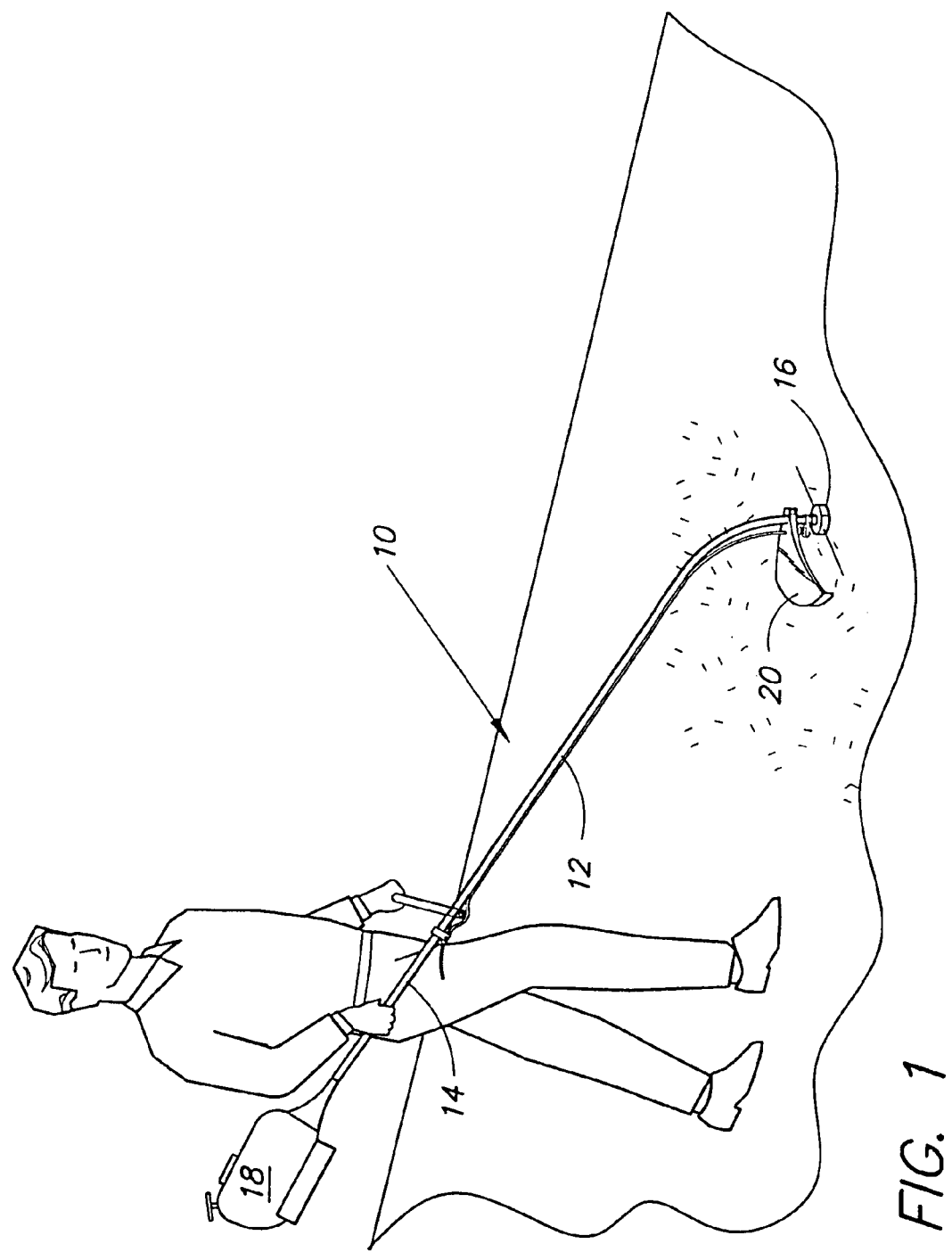
FIG. 1 is an environmental, perspective view of a weed and grass trimmer using a line feeder according to the present invention.
Figure 2:
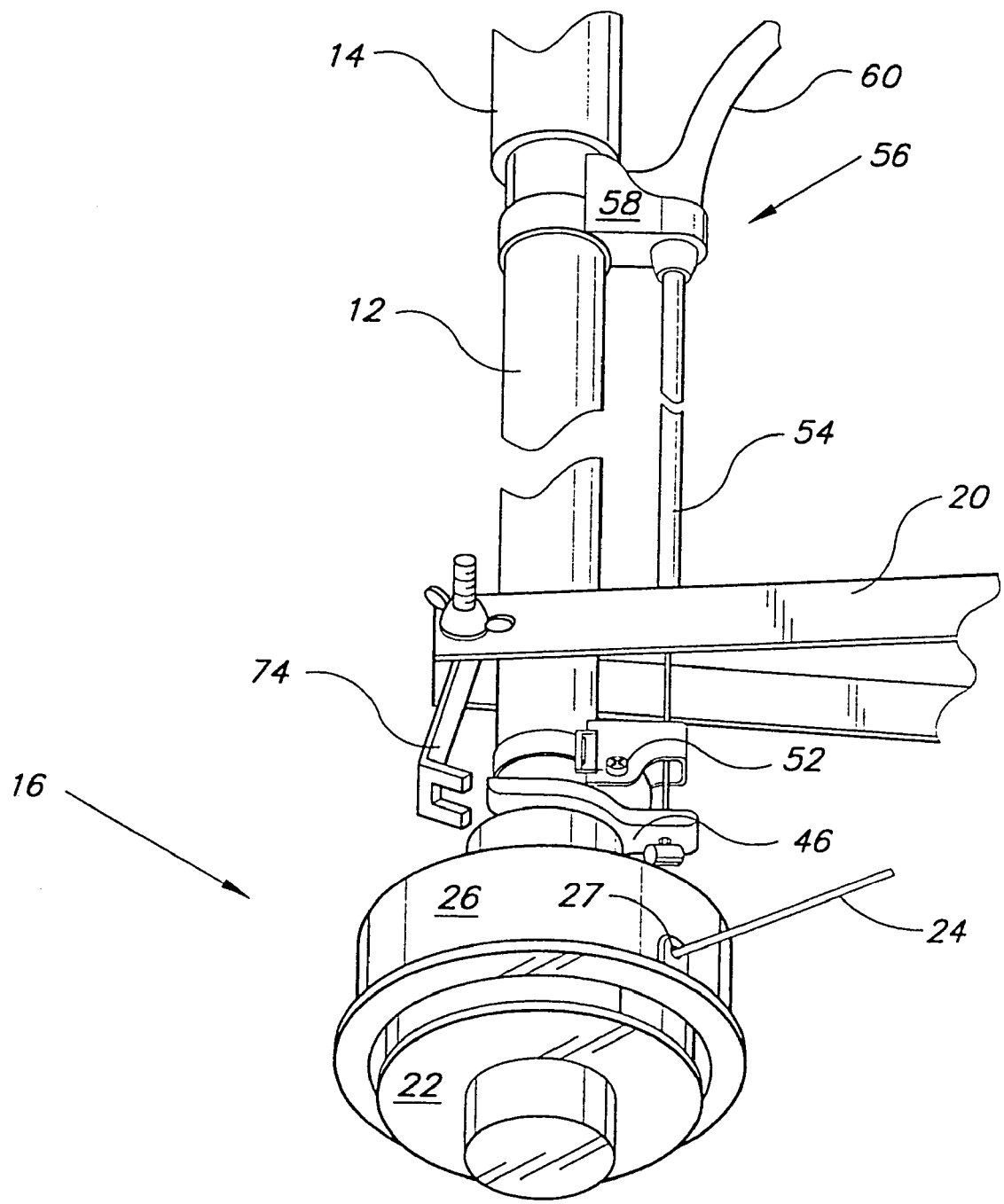
FIG. 2 is a perspective view of the trimming head of a weed and grass trimmer using a line feeder according to the present invention.
Figure 9:
FIG. 9 is an environmental, perspective view of a weed and grass trimmer using a line feeder according to the present invention.
Figure 10:
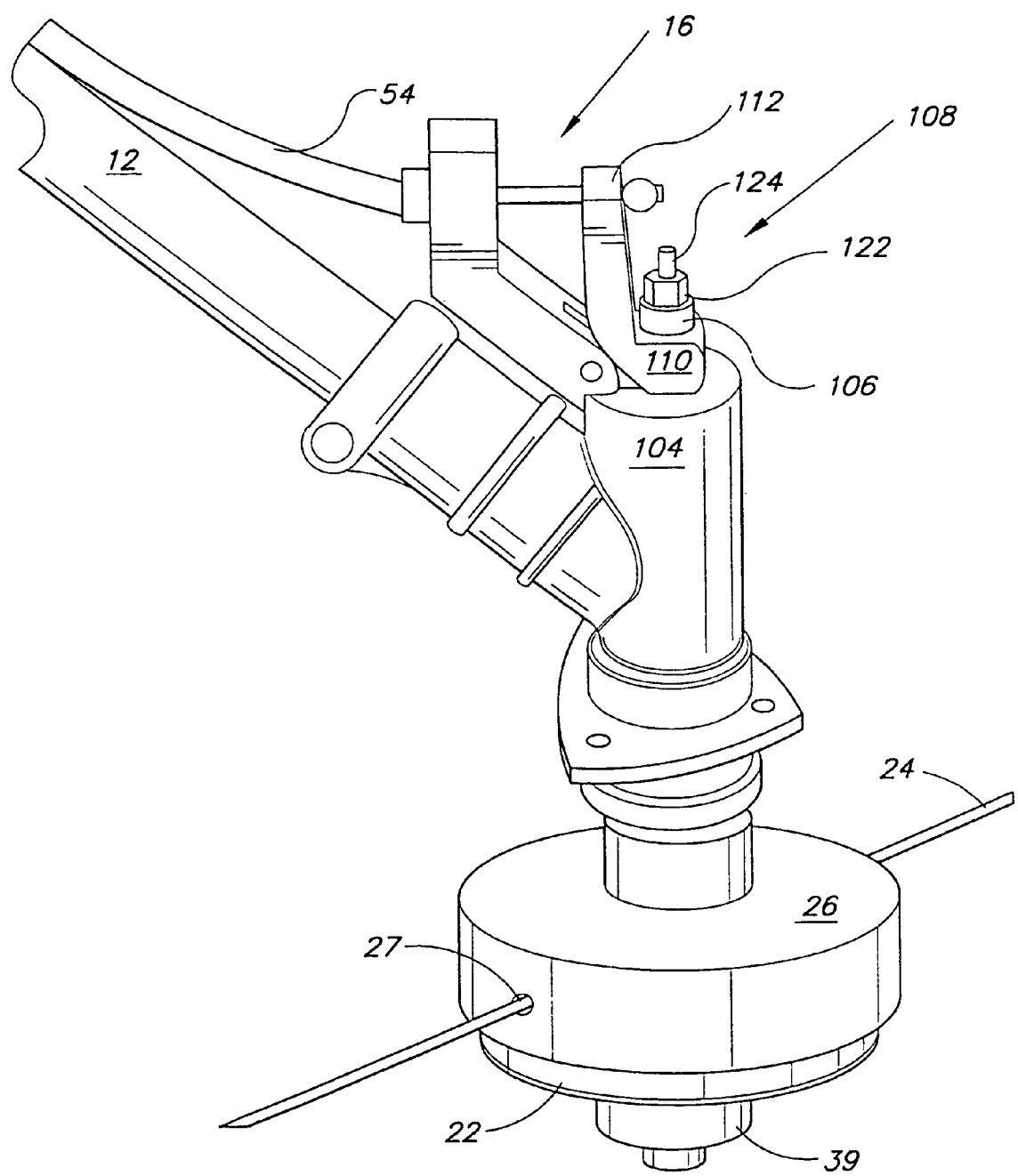
FIG. 10 is a perspective view of the trimming head of a weed and grass trimmer using a line feeder according to the present invention.
Figure 11:
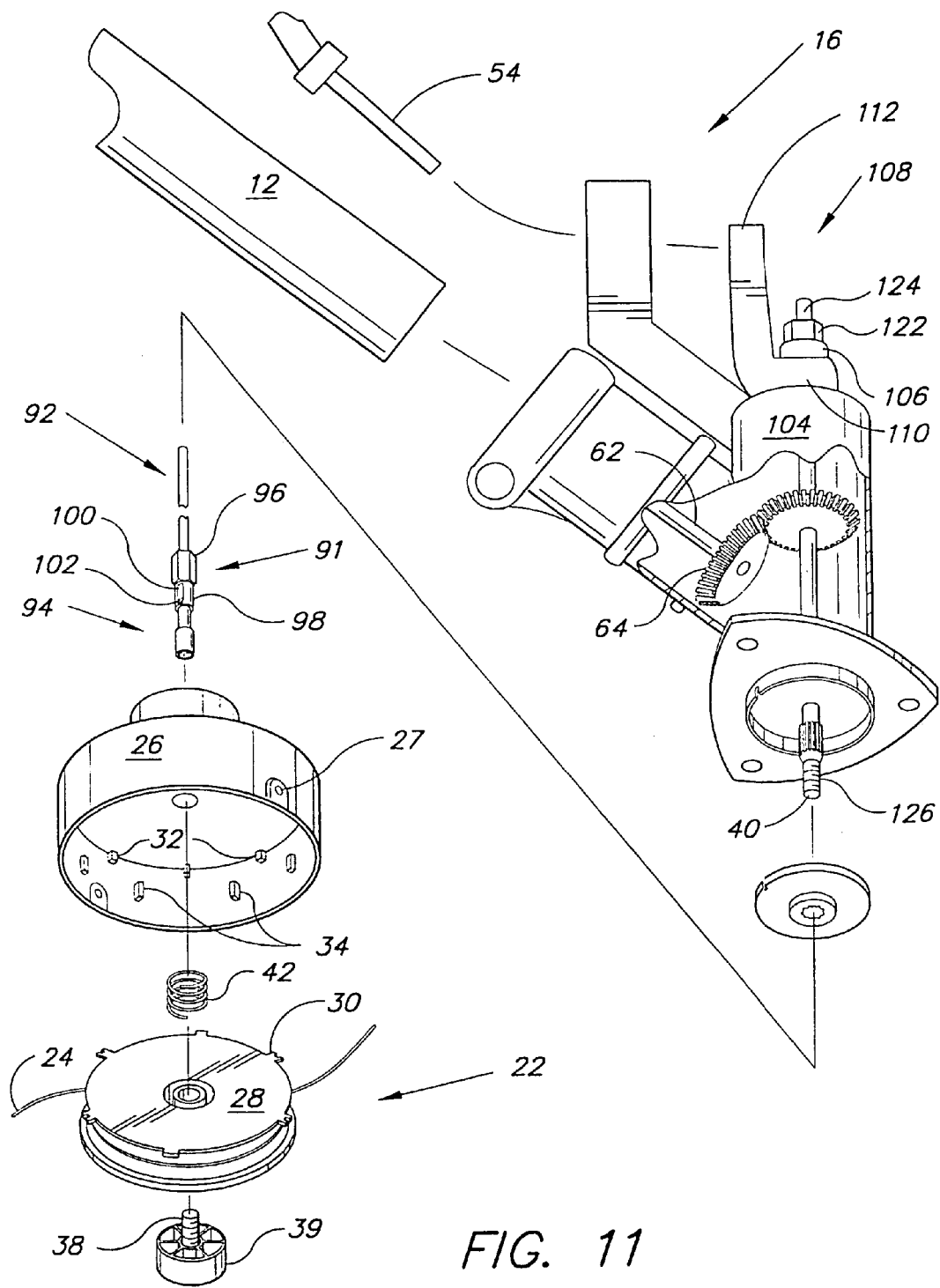
FIG. 11 is an exploded, partially cutaway, perspective view of the trimming head of a weed and grass trimmer using a line feeder according to the present invention.

The present invention is a cutting line feed mechanism for a weed and grass trimmer. Although the general construction and operation of a weed trimmer is well known, it will be described herein to the extent necessary for an understanding of the cutting line feed mechanism of the present invention. Referring to FIGS. 1 and 9, the weed trimmer 10 includes a boom 12 having a handle 14 at one end and a cutting head 16 at the other end. A motor 18 is also included on the weed trimmer 10, and may be of the gasoline powered or electrically powered type. A gasoline powered motor 18 will typically be located on the boom 12 opposite the cutting head, and will be connected to the cutting head's driveshaft 40 by either a cable drive (not shown, and commonly used with curved boom weed trimmers), or a second driveshaft 62 and gear system 64 (FIG. 11). A guard 20 is located above the cutting head 16.

A preferred cutting head 16 is illustrated in FIGS. 2–5, with a very similar cutting head 16 illustrated in FIGS. 2, and 6–8. Either cutting head described herein and illustrated in the above named figures may be used with any gasoline or electric powered weed cutter. The basic operation of both cutting heads 16 is described below. The cutting head 16 includes a spool 22 for holding the cutting wire 24, and a housing 26 covering the top and sides of the spool 22. The housing includes at least one, and preferably two, holes 27 through which the cutting wire 24 passes. The spool includes a plate 28 having outwardly extending flanges 30 around its circumference. The housing has one upper and one lower set of flanges 32,34, respectively, with each set of flanges 32,34 corresponding to the flanges 30 of the spool. The lower flanges 34 are offset from the upper flanges 32, so that each lower flange 34 is centered between two upper flanges 32. The angular separation of the lower flanges 34 is equal to the angular separation of the upper flanges. The bottom plate 36 of the spool 22 includes a threaded rod 38. A driveshaft 40 passes through the housing 26 and spool 22, mating with the threaded rod 38. A spring 42 fits between the spool 22 and housing 26, surrounding the driveshaft 40, biasing the spool 22 and housing 26 apart so that the flanges 30 of the spool 22 engage the lower flanges 34 of the housing 26. Also, the internal female center tube element depending from plate 28 is internally threaded so as to engage the matingly threaded, male element upstanding on bottom plate 36, thus to hold the bobbin and related parts in assembly as will be further explained below.

The cutting head 16 must include some means for causing the spool's flanges 30 to selectively engage either the upper 32 or lower 34 flanges of the housing 26. A bearing 44 extends above the top of the housing 26, surrounding the driveshaft 40. The housing is freely rotatable about the bearing 44 and driveshaft 40. It is suggested that an adaptor 45 be utilized with the bearing, with cylindrical portion 47 within the bearing 44, and hexagonal portion 49 within the top of the housing 26. A fork 46 is pivotally attached to the boom 12, so that the fork's prongs 48 lie on either side of driveshaft 40, abutting the bearing 44. The stem 50, located opposite the fork's pivot 52, is connected at one end to a cable 54. The opposite end of cable 54 is connected to hand lever 56, located adjacent to handle 14. Hand lever 56 is pivotally mounted on the boom 12, with the pivot 58 in close proximity to the boom 12 and the cable 54 connected farther from the boom 12. A finger engaging portion 60 extends upward from the cable 54. Squeezing the finger engaging portion 60 thereby pulls cable 54 upward, thereby pulling stem 50 upward and pushing prongs 48 downward on bearing 44. Housing 26 is thereby pushed towards spool 22, disengaging the spool's flanges 30 from the housing's lower flanges 34, and causing the spool's flanges 30 to engage the housing's upper flanges 32. During the interval in which the spool's flanges 30 are transitioning from the lower flanges 34 to the upper flanges 32, a first increment of cutting line 24 is fed from the spool 22 due to rotation of the spool 22 by the driveshaft 40, the housing 26 being fixed by the prongs 48. Releasing the finger engaging portion 60 allows the spring 42 to bias the housing 26 away from the spool 22, thereby allowing the spool's flanges 30 to engage the housing's lower flanges 34, the spool 22 feeding an additional increment of cutting line 24 during the transition.

Figure 3:
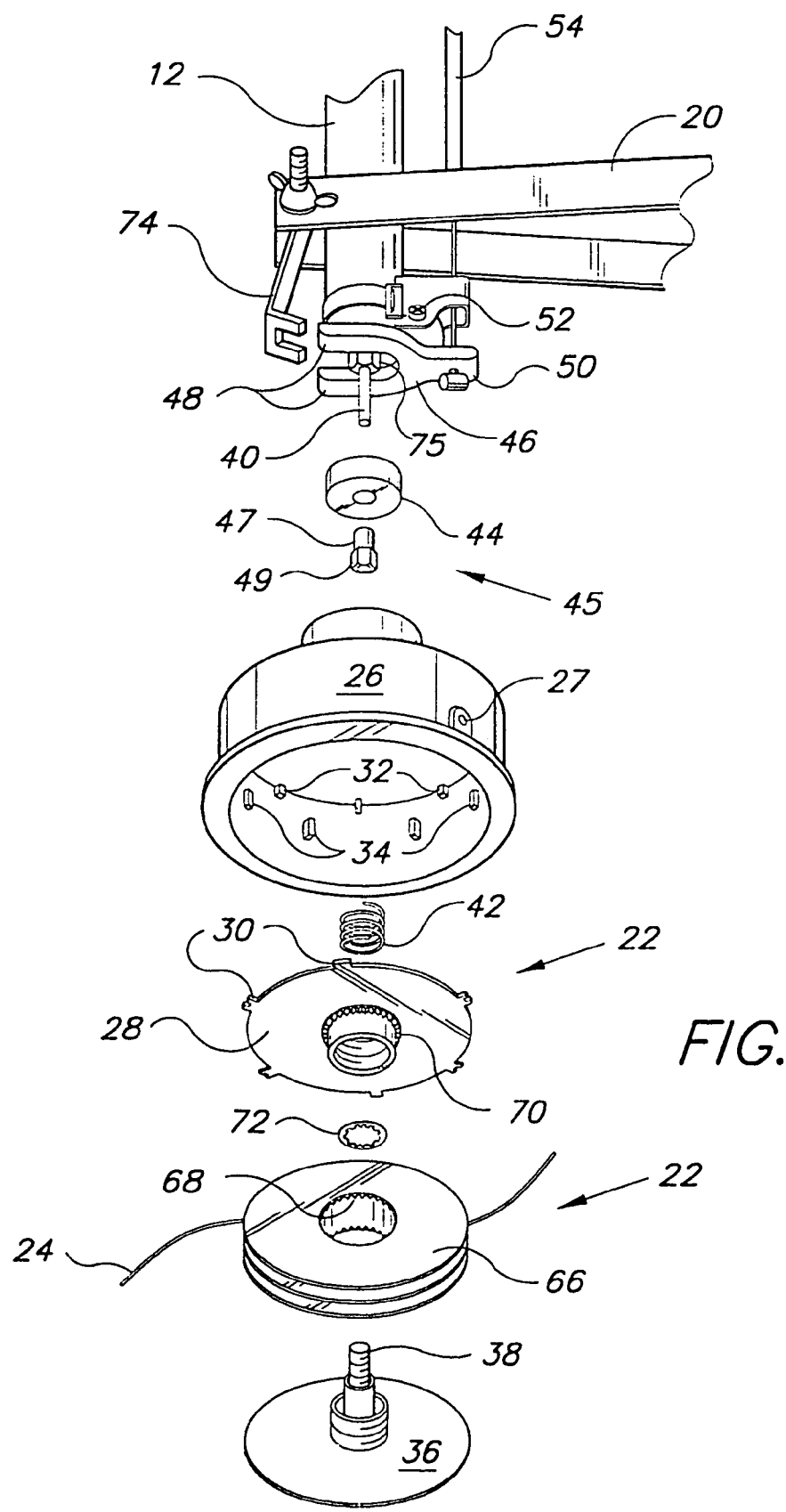
FIG. 3 is an exploded perspective view of the trimming head of weed and grass trimmer using a line feeder according to the present invention.
Figure 3B:
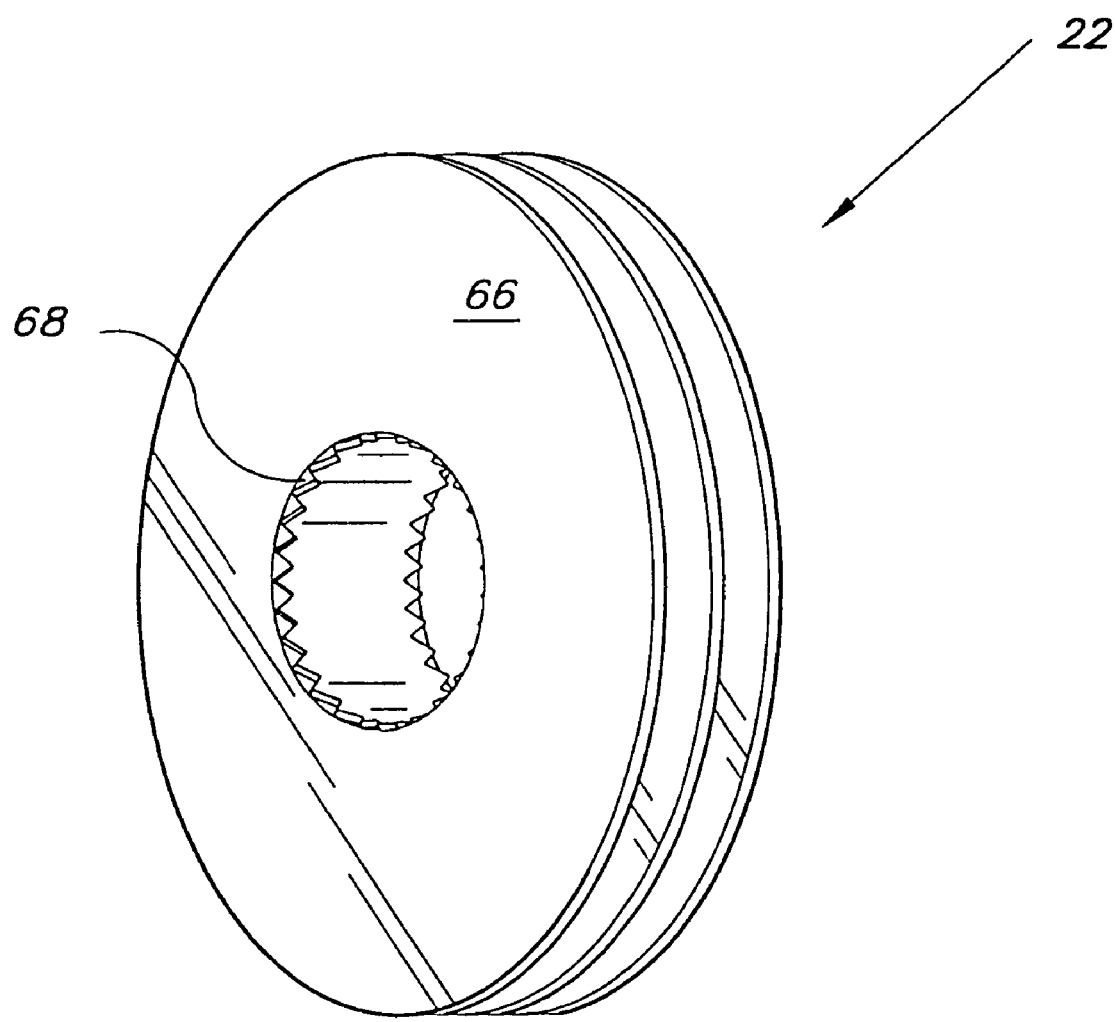
FIG. 3B is a perspective view of the rigid, biodegradable, disposable refill bobbin cutting line spool of the invention.
Figure 4:
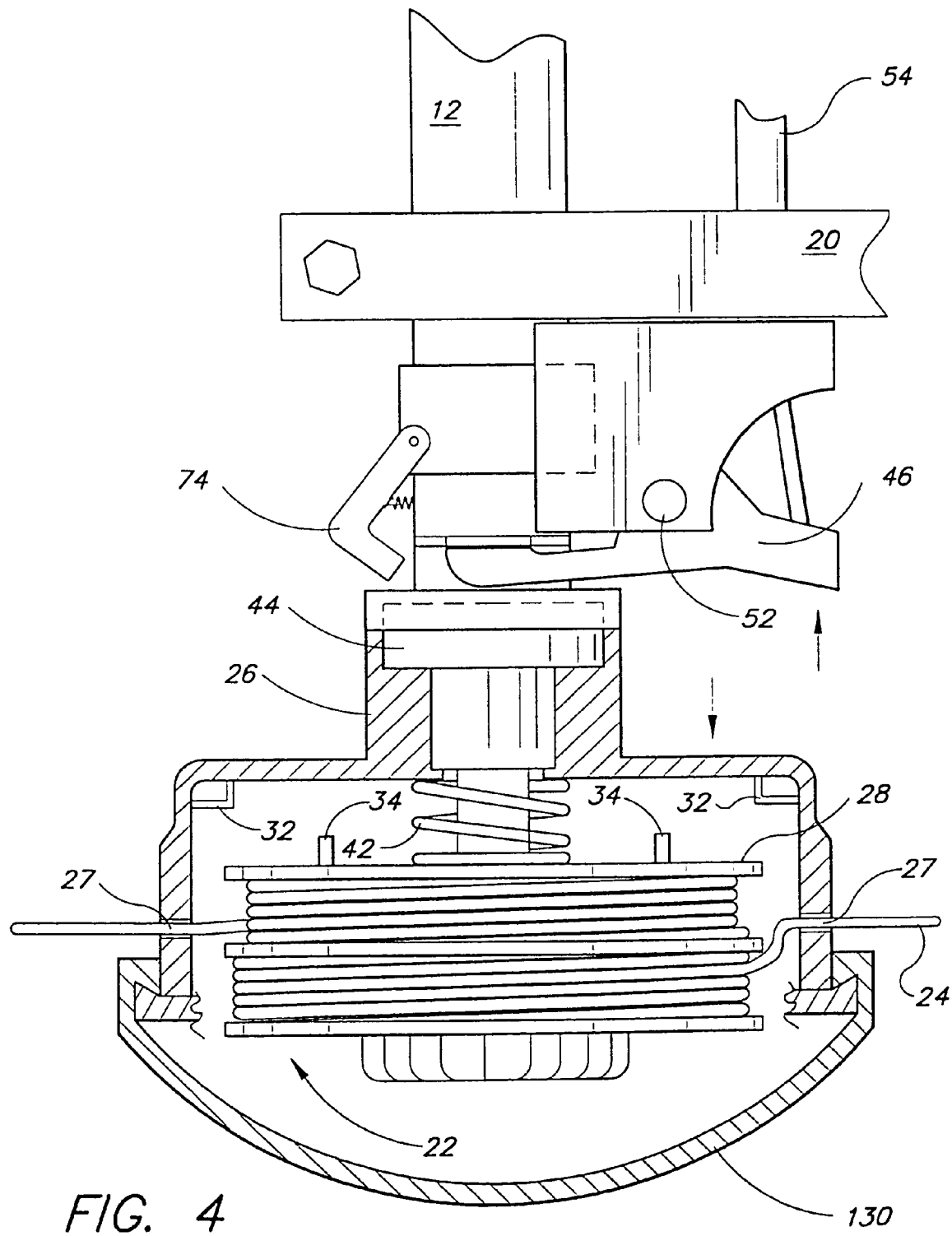
FIG. 4 is a cross sectional view of the trimming head of a weed and grass trimmer using a line feeder according to the present invention, showing the spool housing in its upper position.
Figure 5:
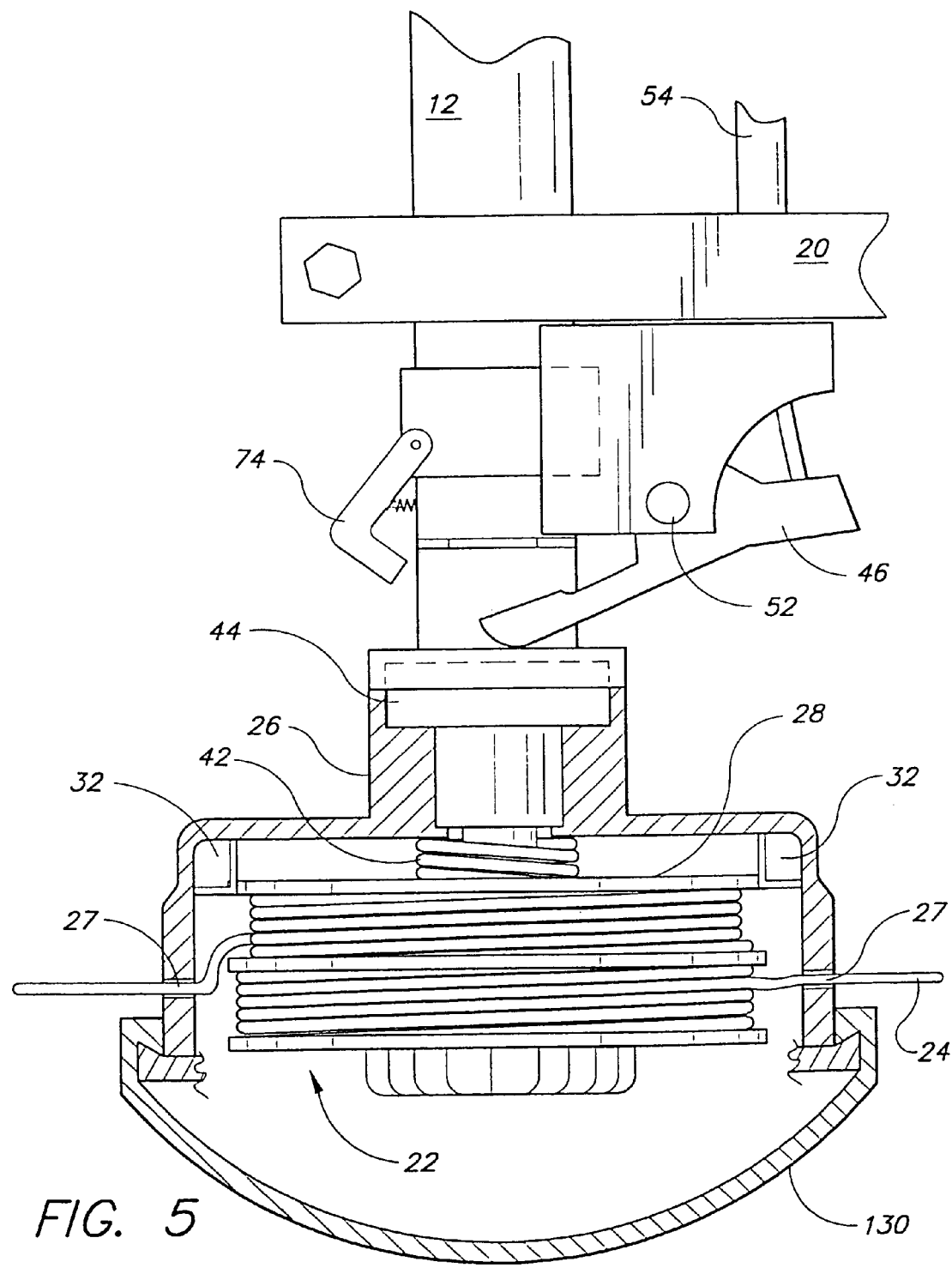
FIG. 5 is a cross sectional view of the trimming head of a weed and grass trimmer using a line feeder according to the present invention, showing the spool housing in its lower position.

The cutting head 16 illustrated in FIGS. 3–5 has the particular advantage of a spool 22 having a universal interchangeable bobbin 66 for holding the cutting line 24. As best seen in FIG. 3B, The bobbin 66 includes two series of teeth 68, one of which is mated with a corresponding set of teeth 70 on the plate 28, so that the bobbin 66, plate 28, and bottom plate 36 which form the spool 22 will rotate as a unit. Bobbin 66 is universal in that it can be turned over and have the other series of teeth 68 matingly engage the teeth 70. Alternatively, the bobbin 66 may be interlocked with the bottom plate 36 by a plurality of teeth (not shown) on the bottom plate 36 which interlock with teeth 68 on the bobbin 66. Further, although teeth 68 and 70 are shown in sawtooth form in the drawings, the teeth 68 and 70 may be square, rectangular, or any other form, provided that the teeth 68 and 70 interlock the bobbin 66 for rotation with the plate 28. Driveshaft locking fork 74, pivotally connected to guard 20, engages the hexagonal portion 75 of driveshaft 40 to prevent the driveshaft 40 from rotating while changing bobbins 66. Lock ring 72 is fastened onto driveshaft 40 between the plate 28 and bobbin 66. When the driveshaft locking fork 74 engages the driveshaft 40, the bottom plate 36 may be unscrewed so that bobbin 66 can easily be removed and replaced. Plate 28 and housing 26 are retained on driveshaft 40 by the lock ring 72.

Figure 3A:
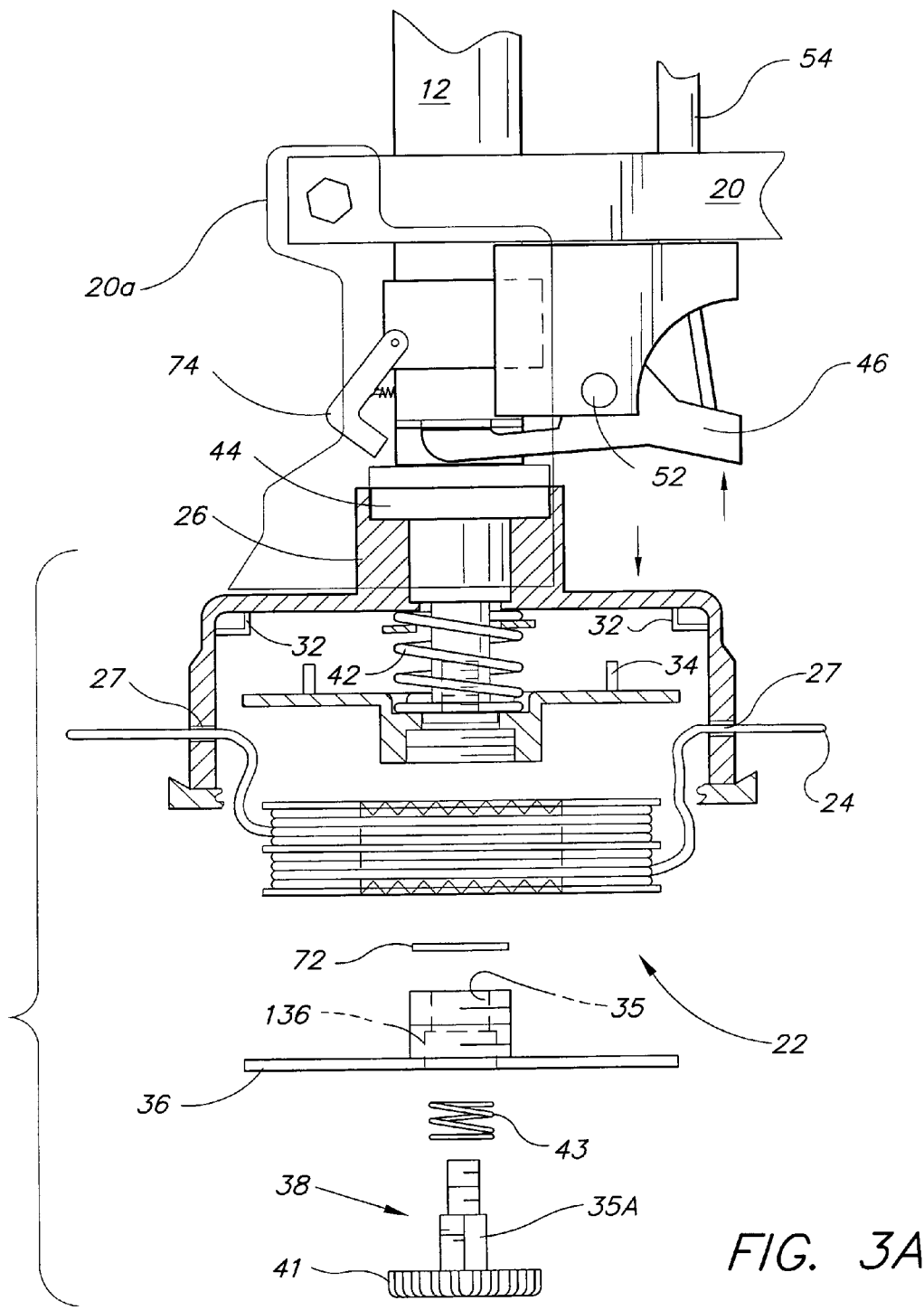
FIG. 3A is a side elevational view, partly in section, showing the components illustrated in FIG. 3, in assembly, and also with a skirted brush guard in place, shown in ghost line.

With particular reference to FIG. 3A, it will be appreciated that the upper left portion of the view indicates a brush guard 20*a* in ghost lines which may be latched in place, e.g., by a shaft adaptor locking component. The brush guard 20*a* protects all the lower components and greatly aids in preventing tall grass, weeds and other debris from winding about and jamming the head assembly, an all too common problem with current grass trimmers.

With further specific reference to FIG. 3A, attention is drawn to the lower part of the view and the following discussion. The plate 36 has a center hole 35 with a square or hexagonal configuration to match and mate with the corresponding square or hexagonal configuration of the shank 35A of bolt 38. Thus, bolt 38 is free to move up and down in plate 36 but is rotatably slaved to the plate so that both elements are rotated together. A ribbed knob 41 is provided on bolt 38. A spring 43 surrounds the unthreaded shank 35A and is inserted in a shouldered hole 136 provided in plate 36; the spring 43 biases the ribbed knob 41 and bolt 38 away from the bottom of plate 36 so the spool 22 can be assembled. A locking ring 72 attached to the upper portion of the unthreaded shank 35A holds the bolt 38 in place. Thus, the bolt 38 can be pressed in or upwardly, and turned in the tighten direction, to attach the spool 22 to the drive shaft 40, to turn as a unit.

Figure 6:
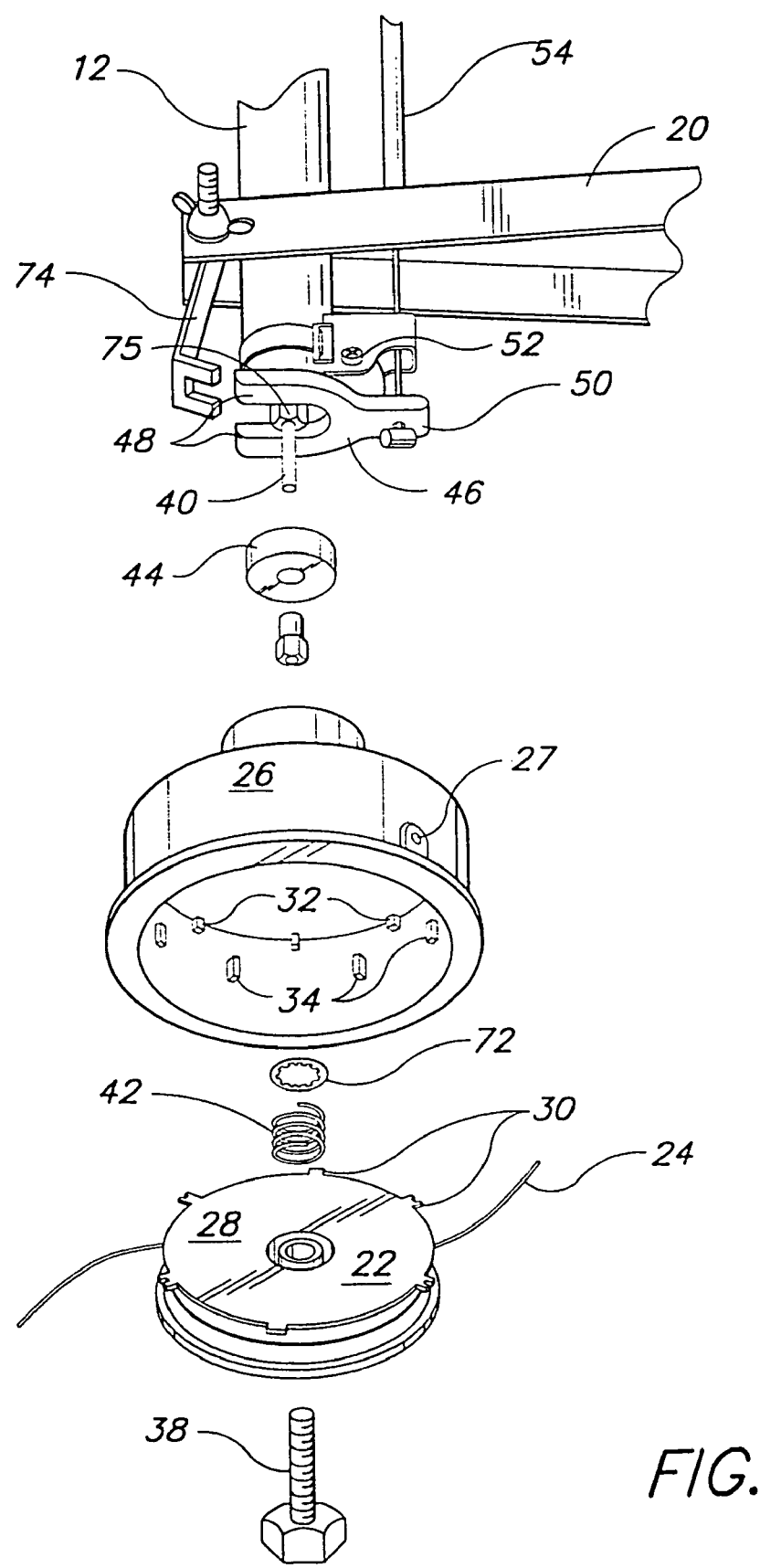
FIG. 6 is an exploded perspective view of the trimming head of a weed and grass trimmer using a line feeder according to the present invention.
Figure 7:
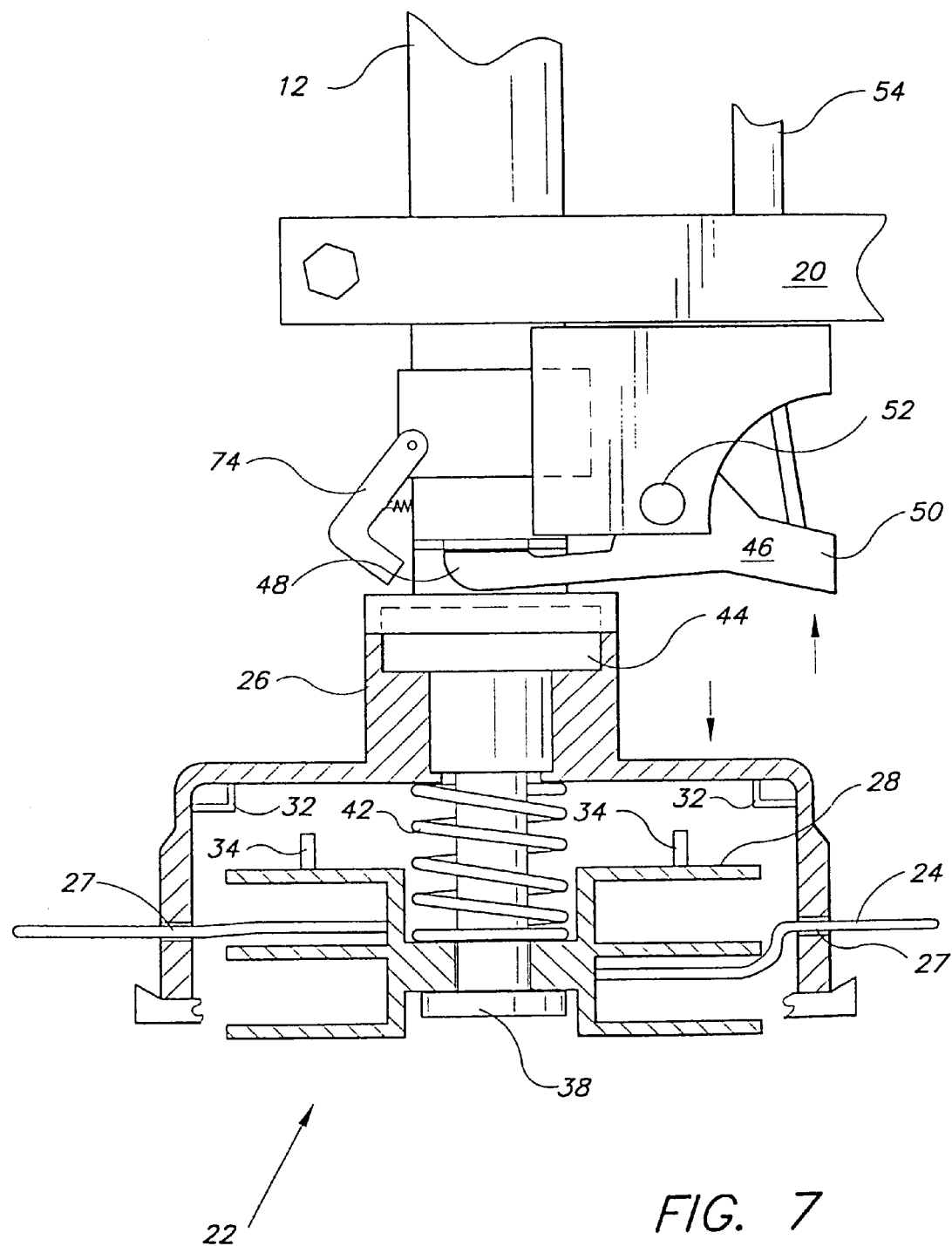
FIG. 7 is a cross sectional view of the trimming head of a weed and grass trimmer using a line feeder according to the present invention, showing the spool housing in its upper position.
Figure 8:
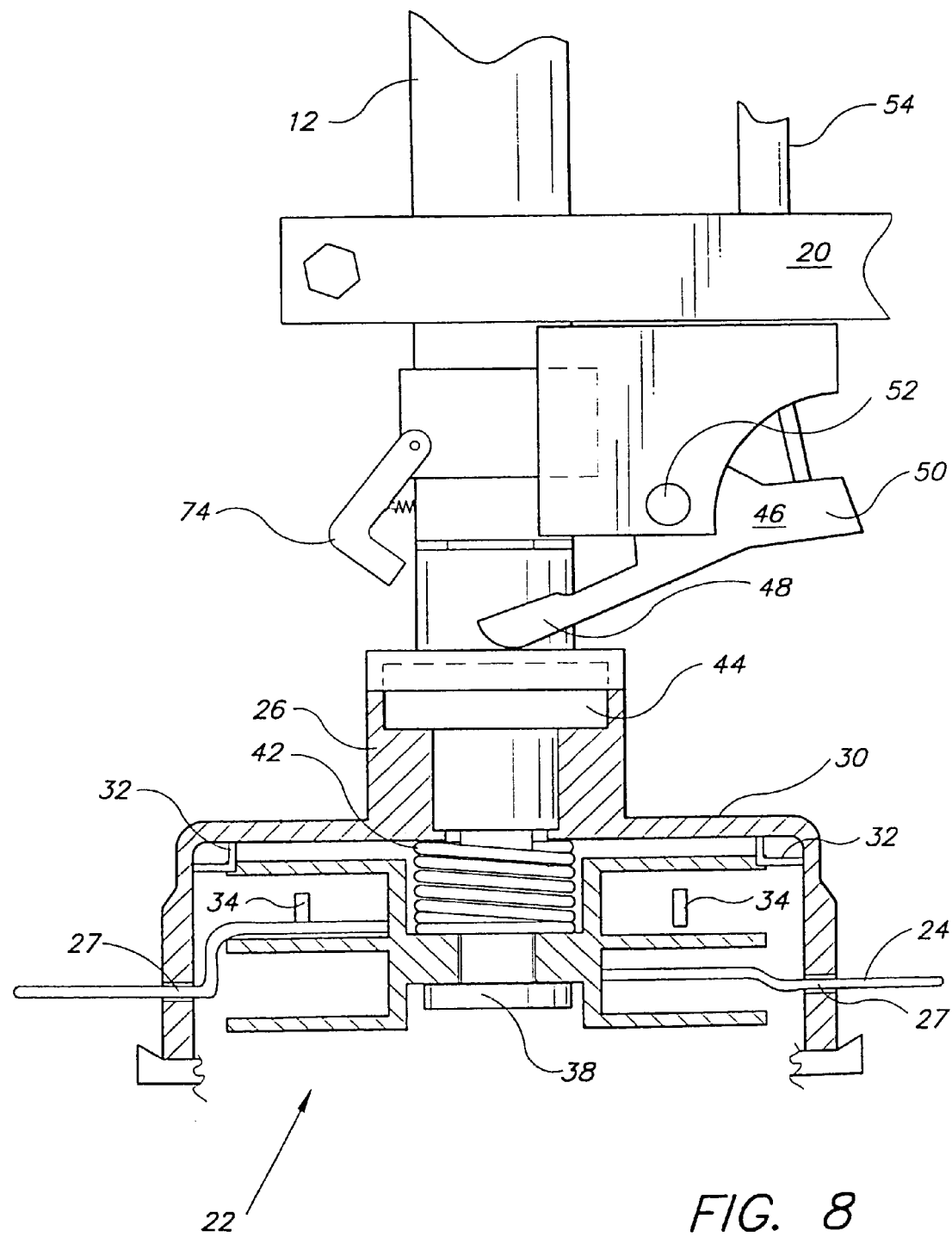
FIG. 8 is a cross sectional view of the trimming head of a weed and grass trimmer using a line feeder according to the present invention, showing the spool housing in its lower position.

Similarly, the spool 22 in FIGS. 6–8 may be removed for winding additional wire 24. After locking fork 74 is positioned around the hexagonal portion 75 of driveshaft 40, threaded bolt 38 can be removed from driveshaft 40, allowing for the removal of spool 22 and spring 42. The locking ring 72, fitting between the spring 42 and housing 26 along driveshaft 40 prevents removal of the housing 26 from the driveshaft 40, facilitating reassembly and preventing unnecessary risk of losing parts. Once sufficient additional wire 24 is wound around spool 22, the spring 42, spool 22, and bolt 38 are reinstalled on the driveshaft 40.

Figure 3C:
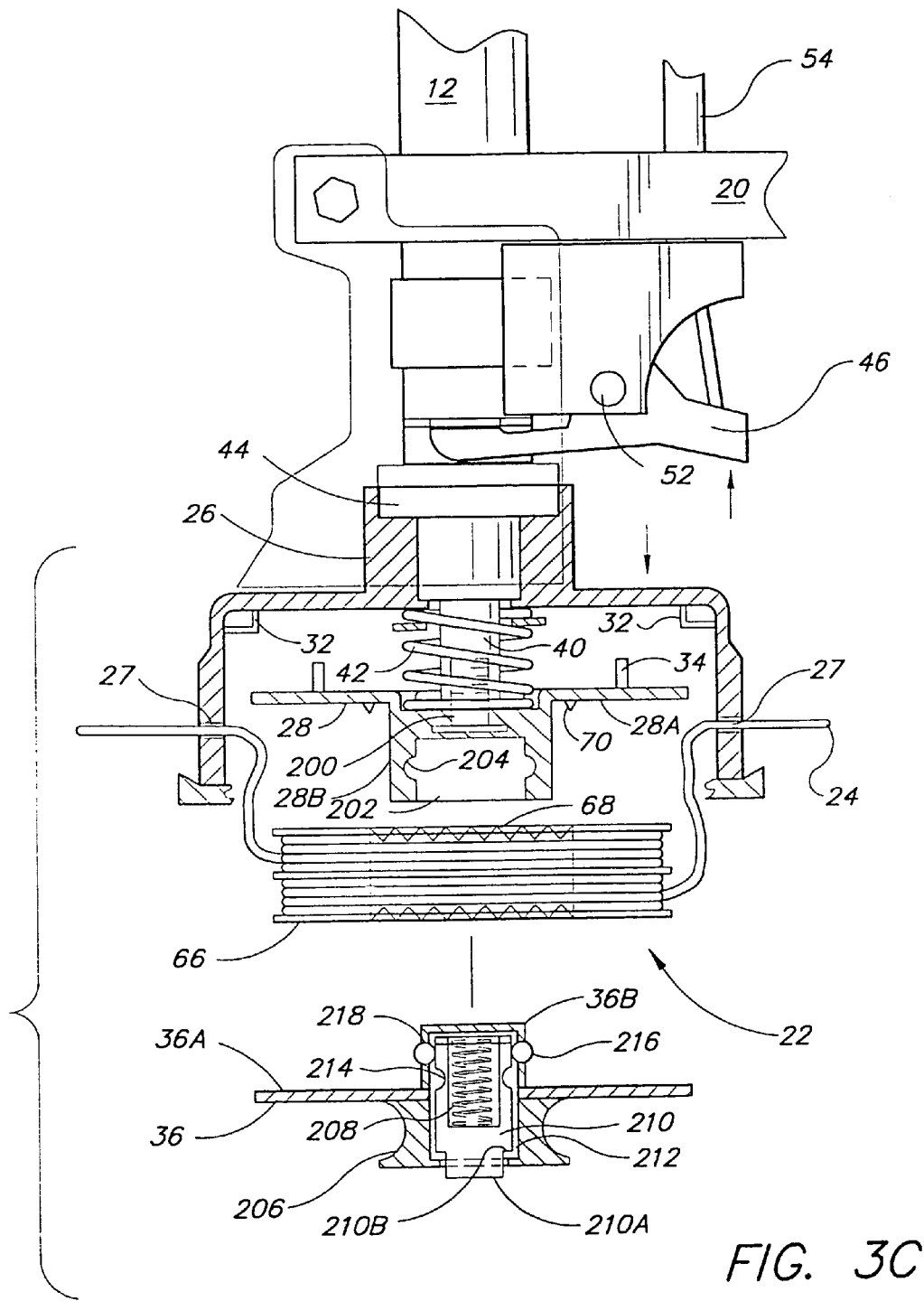
FIG. 3C is an exploded section view of another embodiment of the trimming head of a weed and grass trimmer according to the present invention with the spool bottom plate retained by a detent mechanism.
Figure 3D:
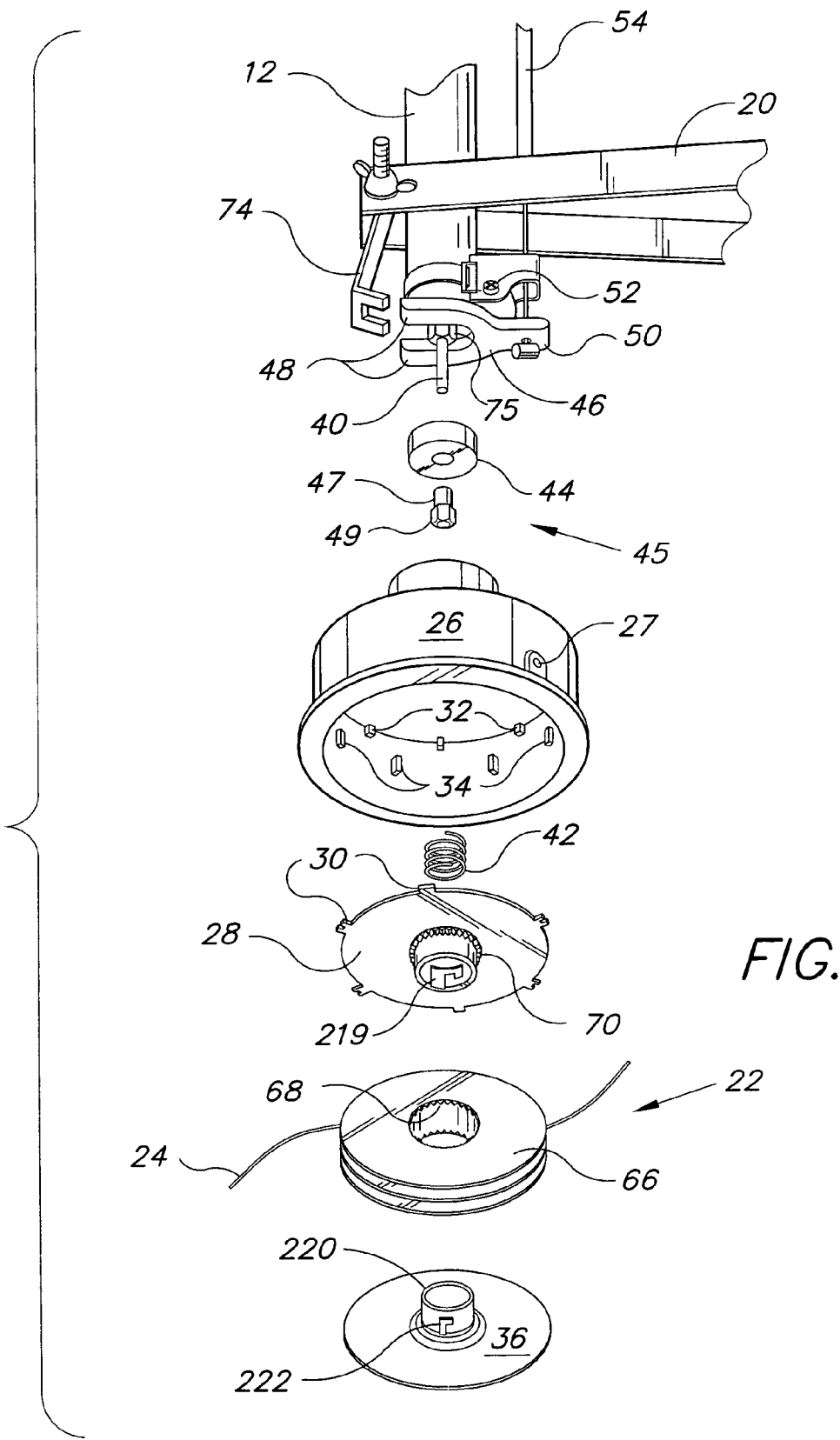
FIG. 3D is an exploded perspective view of another embodiment of the trimming head of a weed and grass trimmer according to the present invention with the spool bottom plate retained by interlocking tabs.

FIGS. 3C and 3D illustrate two additional methods for attaching the spool 22 to the cutting head 16 which may have the advantage of making it easier to detach the spool 22 in order to replace the cutting line 24. FIG. 3C shows an embodiment in which the bottom plate 36 is secured to the top plate 28 of the spool 22 by a detent mechanism. The body of the top plate 28 consists of a circular plate 28a from which a cylindrical barrel 28b depends. The top plate 28 has a threaded bolt 200 extending upward from the plate 28, the head of the bolt 200 being molded into the body of the plate 28. The bolt 200 is used to secure the top plate 28 to an internally threaded aperture in the driveshaft 40, so that the top plate 28 rotates with the driveshaft 40. The bottom face of the barrel 28b has a cylindrical cavity 202 defined therein, the cavity 202 having an annular groove 204 disposed therein. The bobbin 66 is inserted on the cylindrical barrel 28b.

The bottom plate 36 has a body composed of a flat circular plate 36a of the same diameter as the top plate 28a, a knob 206 depending from the bottom face of the bottom plate 36a, and a hollow, cylindrical button housing 36b extending through the center of the knob and above the top face of the plate 36a. A spring 208 is attached to, and depends from, the top wall of the button housing 36b. A cylindrical button 210 is slidably disposed in the bottom housing 36b, the button 210 having a well 212 defined therein for receiving spring 208 which biases button 210 downward so that the head 210a of the button 210 protrudes through a hole in the button housing 36b, the button 210 being retained in the housing 36b by an annular shoulder 210b which abuts an annular flange on the button housing 36b.

The button 210 has an annular groove 214 defined about its circumference. At least two detent balls 216 are disposed between the button 210 and button housing 36b, button housing 36b having at least two holes 218 defined therein having a diameter slightly smaller than the diameter of detent balls 216 so that detent balls 216 partially protrude through holes 218 when spring 208 biases button 210 downward. Button housing 36b has an outside diameter slightly smaller than the inside diameter of cavity 202. When button 210 is pressed upward, spring 208 compresses and detent balls 216 fall backward to partially lodge in groove 214, the outer surface of the balls 216 being planar with the outer surface of button housing 36b so that balls 210 are retained at the height of holes 218. Button housing 36b may be inserted into cavity 202 so that when button 210 is released, detent balls 216 protrude through holes 218 and lodge in groove 204 to retain bottom plate 36 on top plate 28, clamping bobbin 66 therebetween. Cutting line 24 may be replaced by pressing button 210 upward and pulling knob 206 to remove bottom plate 36. This construction has the advantage of eliminating the need for locking fork 74. Cover 130, described below, should be used with this embodiment to prevent accidental triggering of button 210.

FIG. 3D shows an embodiment in which the bottom plate 36 of the spool 22 is secured to the top plate 28 by a plurality of interlocking tabs. In this embodiment, the top plate 28 again has a flat, circular plate 28a with a cylindrical barrel 28b depending therefrom. The barrel 28b is hollow and has a plurality of grooves 219, which may be, e.g., U-shaped, defined therein. The bottom plate 36 has a body composed of a flat, circular plate 36a substantially equal in diameter to the top plate 28a, a knob 206 on the bottom face of the plate 36a, and a cylindrical post 220 arising from its upper face. The tabs 222 protrude from the wall of the cylindrical post 220, and may be, e.g., dog-leg in shape. The diameter of the post 220 is slightly smaller than the inside diameter of the barrel 28b so that the post 220 may be inserted into the barrel 28b, the tabs 222 sliding into a first section of the grooves 219, then rotated through a second section of the groove 219 until the descending leg of the tabs 222 slides down into a third section of the groove 219 to lock the bottom plate 36 to the top plate 28 with the bobbin 66 clamped therebetween. A spring (not shown) may be disposed in the hollow barrel 28b to bias the bottom plate downward. In this embodiment, the cutting line 24 may be replaced by simply twisting the knob 206 to unlock the bottom plate 36 from the spool 22. Advantageously, this embodiment does not require use of the cover 130 to prevent accidental release of the spool 22 from the cutting head 16.

Referring back to FIGS. 4–5, the optional cutting head cover 130 is illustrated. Cover 130 fits over the bottom portion of housing 26, protecting the inside of housing 26 and the spool 22 from debris. Additionally, cover 130 allows cutting head 16 to be rested on the ground during use. The cutting heads of conventional weed trimmers must be continuously held above the ground, except when bump feeding additional cutting wire. The cover 130 of the present invention permits a user to momentarily rest the cutting head 16 on the ground without interference with the cutting operation. This advantage can be particularly helpful for handicapped users or for users with unusually low strength.

It will be realized that in each of the embodiments shown in FIGS. 2–8 the housing is rotatably disposed about the driveshaft 40 and/or bearing 44, rotating motion being imparted to the bearing when the flanges 30 on the spool 22 engage either the upper 32 or lower 34 flanges in the housing 26. In each embodiment the spool 22 is coupled to the driveshaft 40 so that the spool 22 rotates with the driveshaft 40, cutting line being fed by pressing the housing 26 down on the spool 22. The differences in the embodiments arise from whether the spool 22 has universal bobbin 66, from whether the top plate 28 of the bottom plate 36 is attached to the driveshaft 40, and from the manner of removing the spool 22 to replace cutting line 24.

Figure 14:
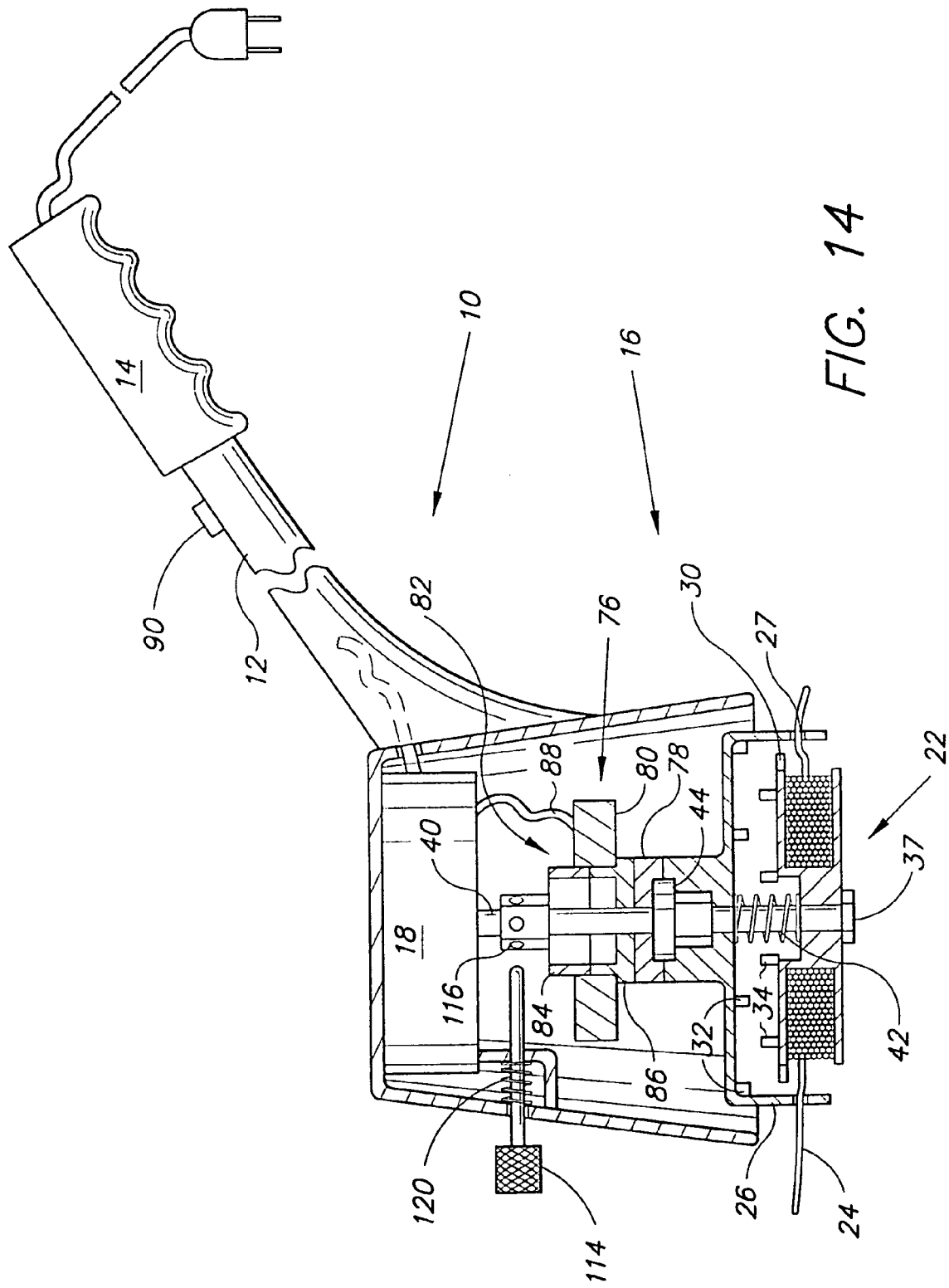
FIG. 14 is a cross sectional side view of the trimming head of a weed and grass trimmer using a line feeder according to the present invention, with the housing in the upper position.
Figure 15:
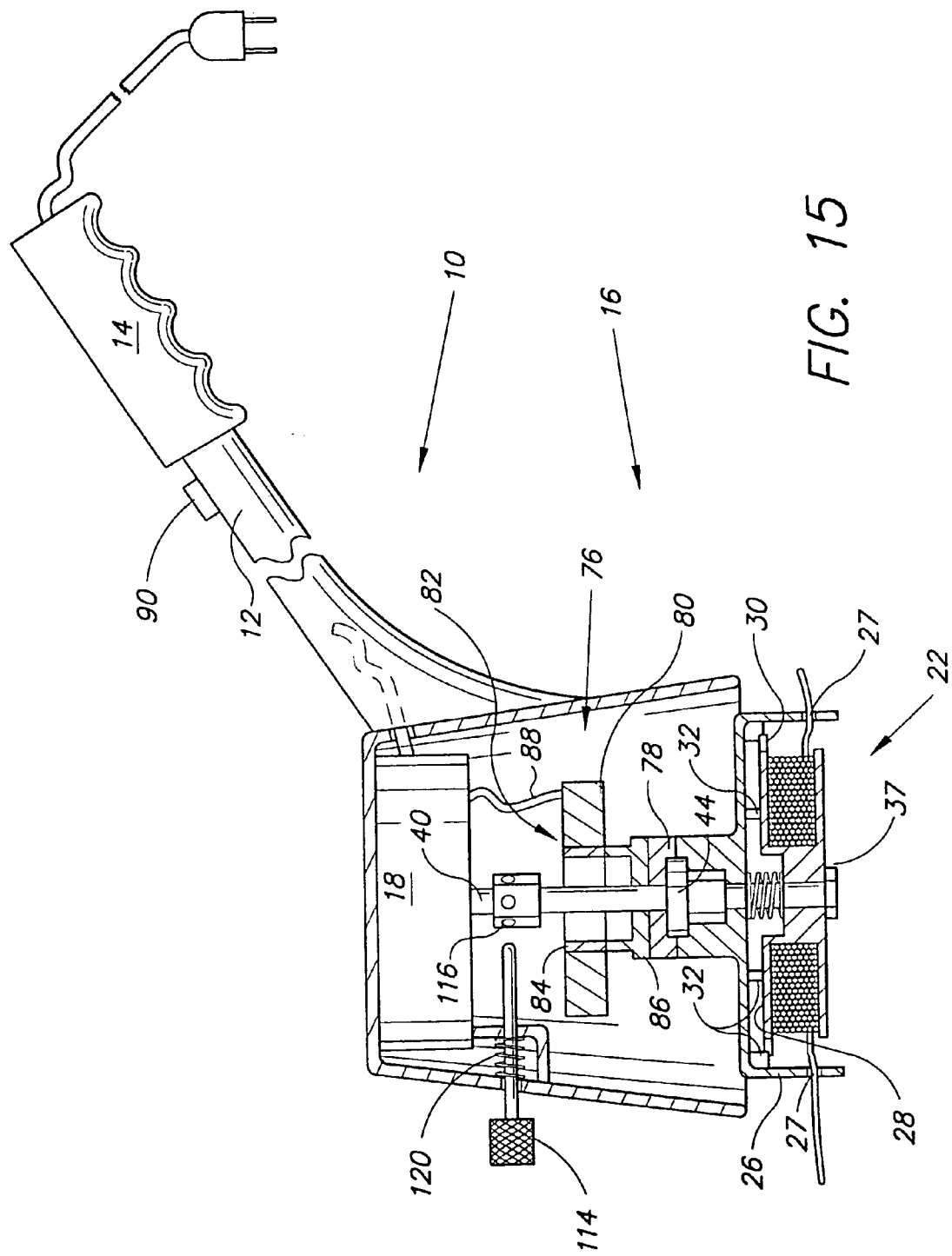
FIG. 15 is a cross sectional side view of the trimming head of a weed and grass trimmer using a line feeder according to the present invention, with the housing in the lower position.

FIGS. 14–15 illustrate a line feed mechanism very similar to that of the above described FIGS. 2–8, with the difference being the use of a solenoid 76 to actuate the line feed mechanism. For purposes of illustration, the line feed mechanism is illustrated as part of a weed trimmer 10 having an electric motor 18, although the solenoid 76 is equally workable with any gasoline powered weed trimmer 10, in exactly the same manner as described herein. The cutting head 16 includes a spool 22 for holding the cutting wire 24, and a housing 26 covering the top and sides of the spool 22. The housing includes at least one, and preferably two, holes 27 through which the cutting wire 24 passes. The spool includes a plate 28 having outwardly extending flanges 30 around its circumference. The housing has one upper and one lower set of flanges 32,34, respectively, with each set of flanges 32,34 corresponding to the flanges 30 of the spool. The lower flanges 34 are offset from the upper flanges 32, so that each lower flange 34 is centered between two upper flanges 32. The bottom of the spool 22 includes a threaded bolt 37. A driveshaft 40 passes through the housing 26 and spool 22, mating with the threaded bolt 37. A spring 42 fits between the spool 22 and housing 26, surrounding the driveshaft 40, biasing the spool 22 and housing 26 apart so that the flanges 30 of the spool 22 engage the lower flanges 34 of the housing 26.

The cutting head 16 must include some means for causing the spool's flanges 30 to selectively engage either the upper 32 or lower 34 flanges of the housing 26. A bearing 44 fits on top of the housing 26, surrounding the driveshaft 40, and preferably has a bearing cap 78 directly on top of it. Solenoid 76 is located directly above bearing cap 78 and also preferably surrounds the driveshaft 40. Solenoid 76 includes an electromagnet 80, surrounding a plunger 82. The plunger 82 has a ferrous portion 84 on top of a nonferrous portion 86, with the nonferrous portion 86 resting on top of the bearing cap 78. An electrical wire 88 extends from the electromagnet 80 to the electric motor 18 (or to the electrical system of a gasoline motor, which is not shown but would be within the ability of one skilled in the art), thereby supplying power to the electromagnet. A normally open button 90 is mounted on the boom 12, in close proximity to the handle 14. As would be well known to one skilled in the art, a complete electrical circuit will be wired (not shown) between the motor 18 (power supply), the button 90, and the electromagnet 80. Pushing the button 90 thereby activates the electromagnet 80, pulling the ferrous portion 84 within the electromagnet 80, and pushing down on the nonferrous portion 86, bearing cap 78, and bearing 44. Housing 26 is thereby pushed towards spool 22, disengaging the spool's flanges 30 from the housing's lower flanges 34, and causing the spool's flanges 30 to engage the housing's upper flanges 32. Releasing the button 90 deactivates the electromagnet 80, allowing the spring 42 to bias the housing 26 away from the spool 22, thereby allowing the spool's flanges 30 to engage the housing's lower flanges 34.

The electrically powered/solenoid actuated weed trimmer 10 of FIGS. 14–15 is illustrated having a spindle 22 without a replaceable bobbin 66, but those skilled in the art, upon reading the above description, will realize that a spindle having the replaceable bobbin 66 could be easily used. Replacement of the wire 24 is accomplished in a manner similar to that described above. First, the driveshaft 40 must be prevented from rotating to facilitate removal of bolt 37. This is preferably accomplished by using a pin 114 fitting within a hole 116 in the driveshaft 40. Pin 114 is normally biased outward by spring 120, and must be held within the hole 116 during removal of the bolt 37. Next, spool 22 and spring 42 may be removed from driveshaft 40. Once sufficient additional wire 24 is wound around spool 22, the spring 42, spool 22, and bolt 37 are reinstalled on the driveshaft 40.

An additional embodiment of a weed trimmer 10 using the line feed mechanism of the present invention is illustrated in FIGS. 9–13. This line feed mechanism is particularly suited to gasoline powered, straight boom, gear driven weed trimmers 10. The cutting head 16 includes a spool 22 for holding the cutting wire 24, and a housing 26 covering the top and sides of the spool 22. The housing includes at least one, and preferably two, holes 27 through which the cutting wire 24 passes. The spool includes a plate 28 having outwardly extending flanges 30 around its circumference. The housing has one upper and one lower set of flanges 32,34, respectively, with each set of flanges 32,34 corresponding to the flanges 30 of the spool. The lower flanges 34 are offset from the upper flanges 32, so that each lower flange 34 is centered between two upper flanges 32. The bottom of the spool 22 includes a cap 39 having a threaded rod 38. The cutting head 16 must include some means for causing the spool's flanges 30 to selectively engage either the upper 32 or lower 34 flanges of the housing 26. Therefore, internal shaft 91 passes through the housing 26 and spool 22, mating with the threaded rod 38 and with the driveshaft 40. The internal shaft 91 includes an upper portion 92 and a lower portion 94. The bottom of upper portion 92 includes a hexagonal section 96 for preventing rotation relative to the housing 26, and a hollow portion 98 having a slot 100. The hexagonal section 96 is internally threaded at its upper end, and is dimensioned and configured to mate with the external threads 126 of driveshaft 40, so that inner shaft 91 and driveshaft 40 rotate as a single unit. The lower portion is dimensioned and configured to fit within the hollow portion 98, with pin 102 sliding within the slot 100. The lower portion 94 can therefore reciprocate vertically with respect to the upper portion 92, but can not rotate with respect to the upper portion 92. A spring 42 fits between the spool 22 and housing 26, surrounding the inner shaft 91, biasing the spool 22 and housing 26 apart so that the flanges 30 of the spool 22 engage the lower flanges 34 of the housing 26.

Figure 12:
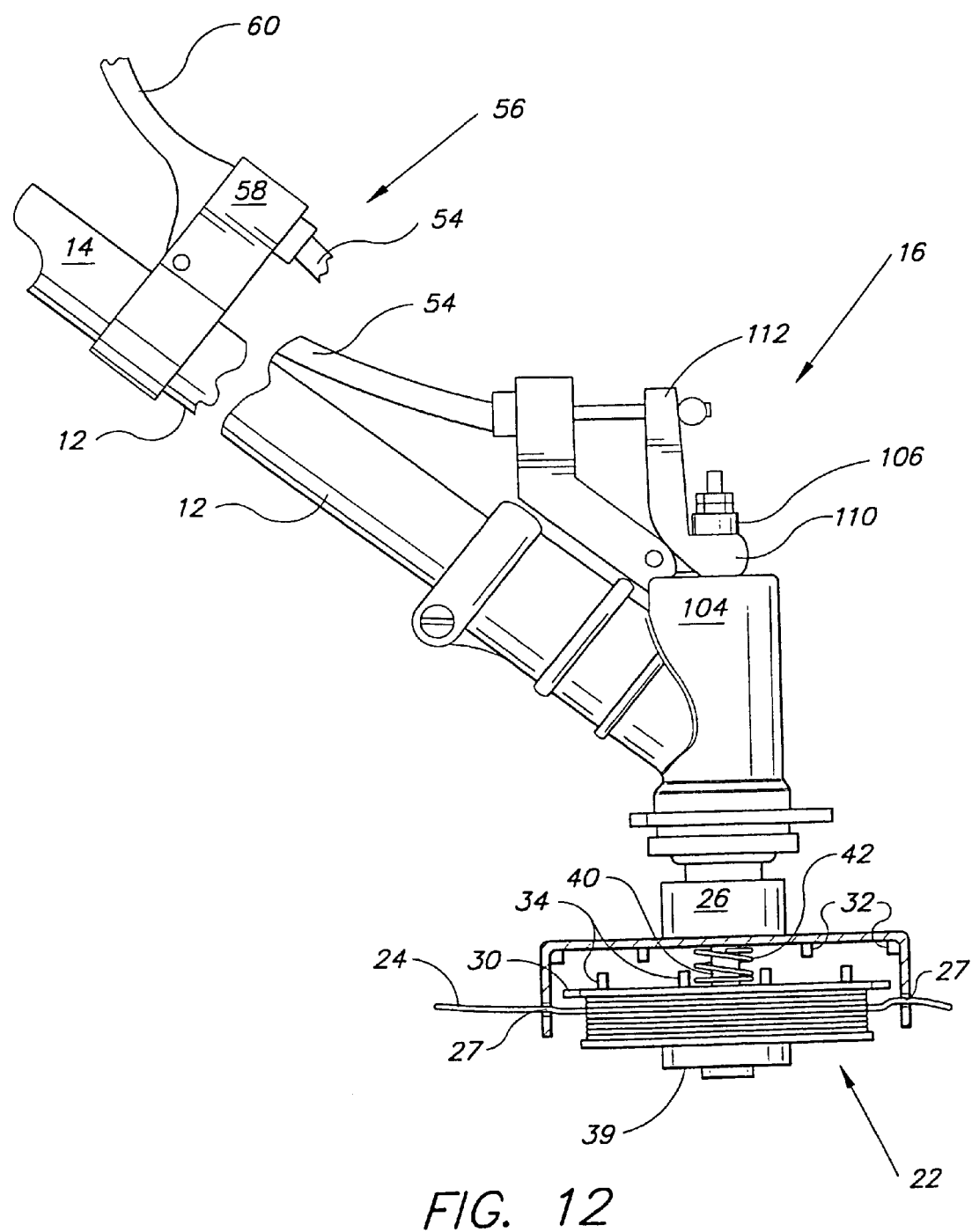
FIG. 12 is a partially sectional side view of the trimming head of a weed and grass trimmer using a line feeder according to the present invention, with the spool in the lower position.
Figure 13:
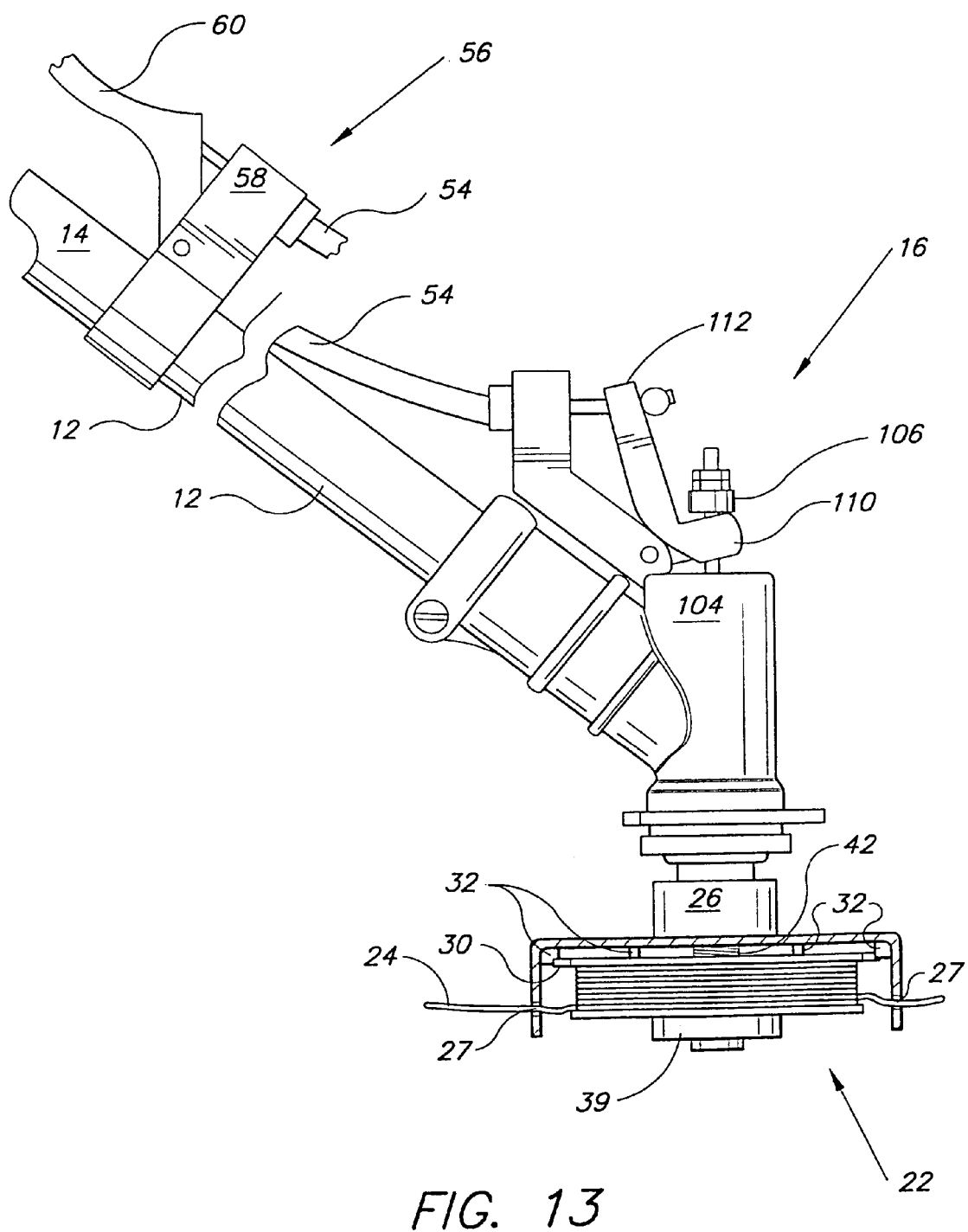
FIG. 13 is a partially sectional side view of the trimming head of a weed and grass trimmer using a line feeder according to the present invention, with the spool in the upper position.

The driveshaft 40 extends upward through housing 104, and has a bearing 106 at its upper end. Bearing 106 rests on top of the horizontal portion 110 of a lever 108, secured in place by nut 122 engaging the threaded upper portion 124 of drive shaft 40. The vertical portion 112 of the lever 108 is connected at one end to a cable 54. The opposite end of cable 54 is connected to hand lever 56, located adjacent to handle 14. Hand lever 56 is pivotally mounted on the boom 12, with the pivot 58 in close proximity to the boom 12 and the cable 54 connected farther from the boom 12. A finger engaging portion 60 extends upward from the cable 54. During use, the spool 22 and housing 26 are located as illustrated in FIG. 12, with the spool's flanges 30 engaging the housing's lower flanges 34. Squeezing the finger engaging portion 60 pulls cable 54 upward, thereby pulling shaft upper portion 92 upward. Spool 22 is thereby pulled upward towards housing 26, disengaging the spool's flanges 30 from the housing's lower flanges 34, and causing the spool's flanges 30 to engage the housing's upper flanges 32 (FIG. 13). Releasing the finger engaging portion 60 allows the spring 42 to bias the spool 22 away from the housing 26, thereby allowing the spool's flanges 30 to engage the housing's lower flanges 34.

The weed trimmer 10 of FIGS. 9–13 is illustrated having a spool 22 without a replaceable bobbin 66, but those skilled in the art will, upon reading the above description, recognize that a replaceable bobbin 66, as described above, could easily be used. To replace the wire 24, the end cap 39 is first unscrewed from the inner shaft 91. Spool 22 may then be removed, and the wire 24 replaced. Spool 22 may then be reinstalled on inner shaft 91, and end cap 39 reattached to inner shaft 91.

Figure 12A:
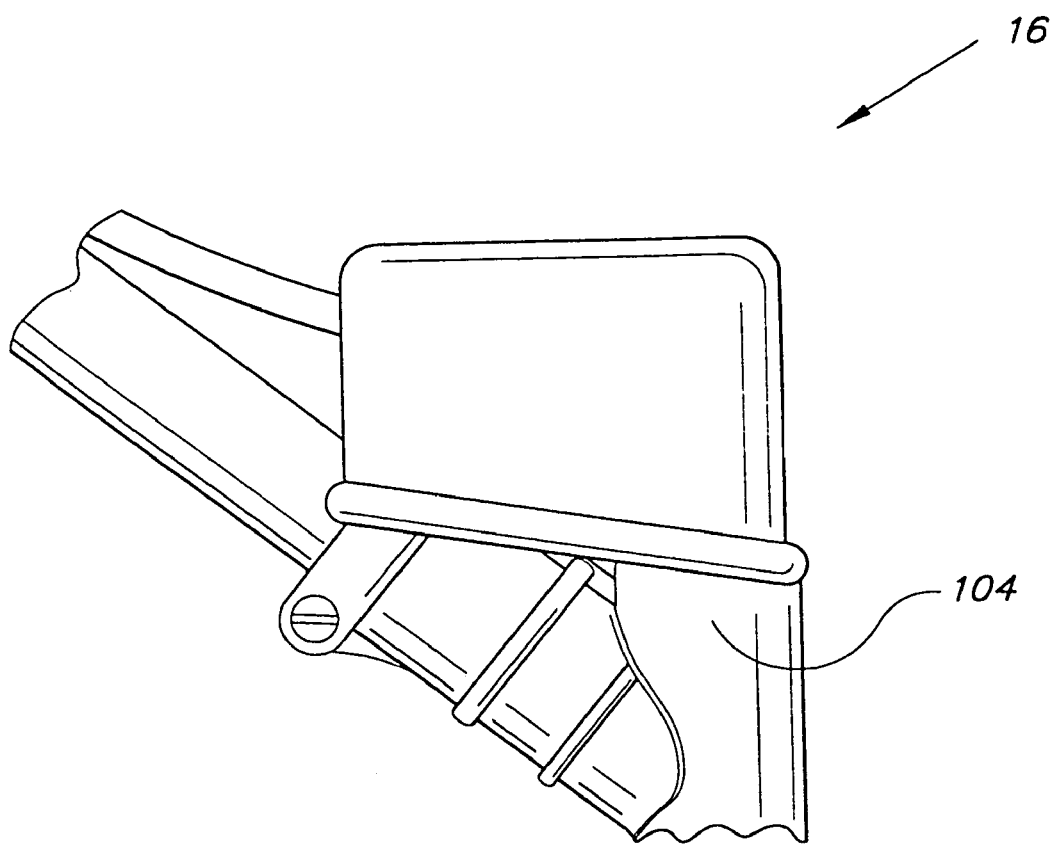
FIG. 12A is a fragmentary side view of FIG. 12, showing components covered with a protective dust cover.

FIG. 12A illustrates another important protective structure of the instant invention, namely, a dust cover for components, e.g., 106, 110 and 112 illustrated in FIG. 12. The dust cover may be secured firmly in place, as by screws through the top of the cover (not shown) and a cooperative locking lip and flange at the lower front edge of the dust cover (not shown).

Figure 16:
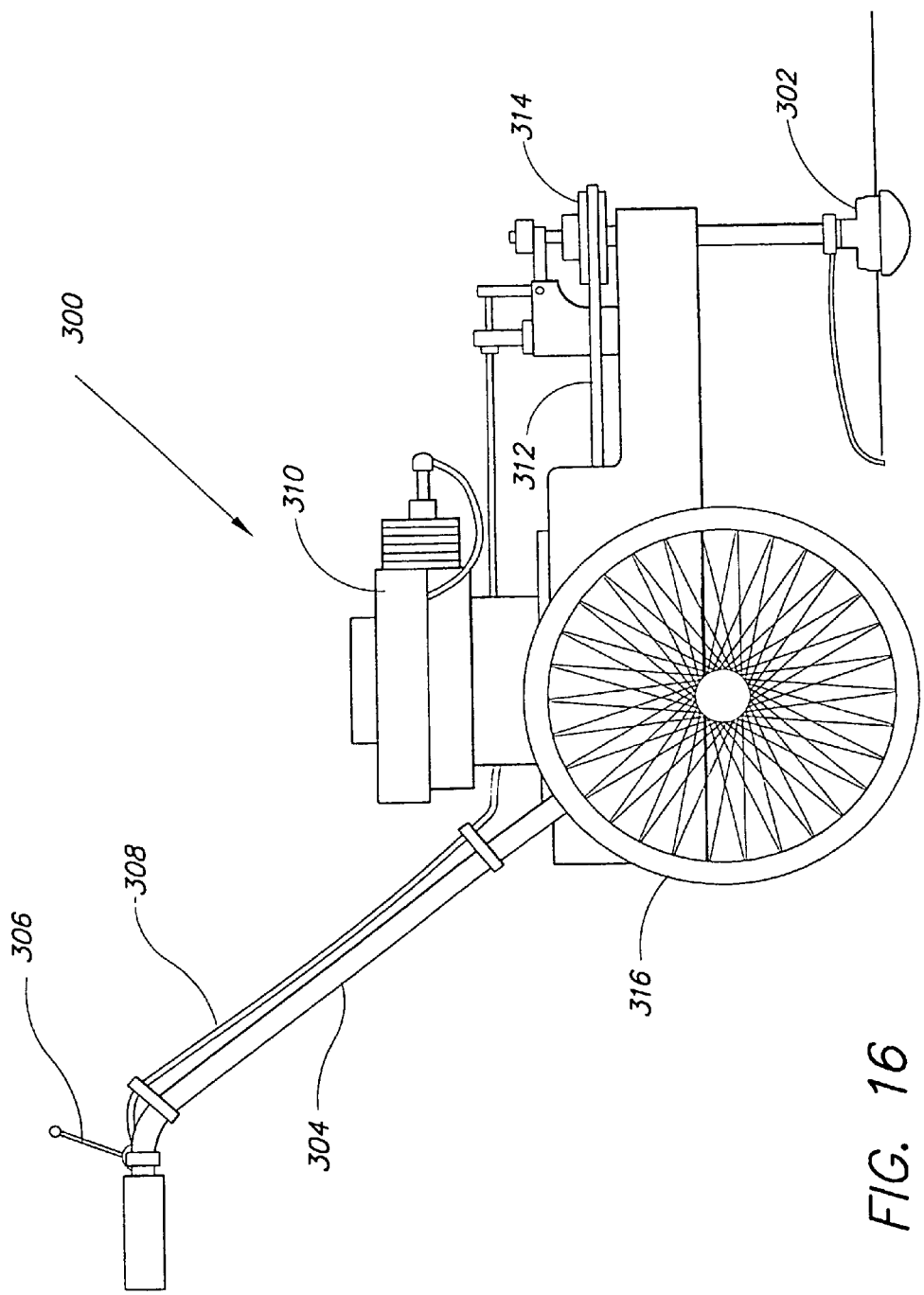
FIG. 16 is an elevational view of a wheeled weed and grass trimmer with a weed and grass trimmer line feeder according to the present invention.
Figure 17:
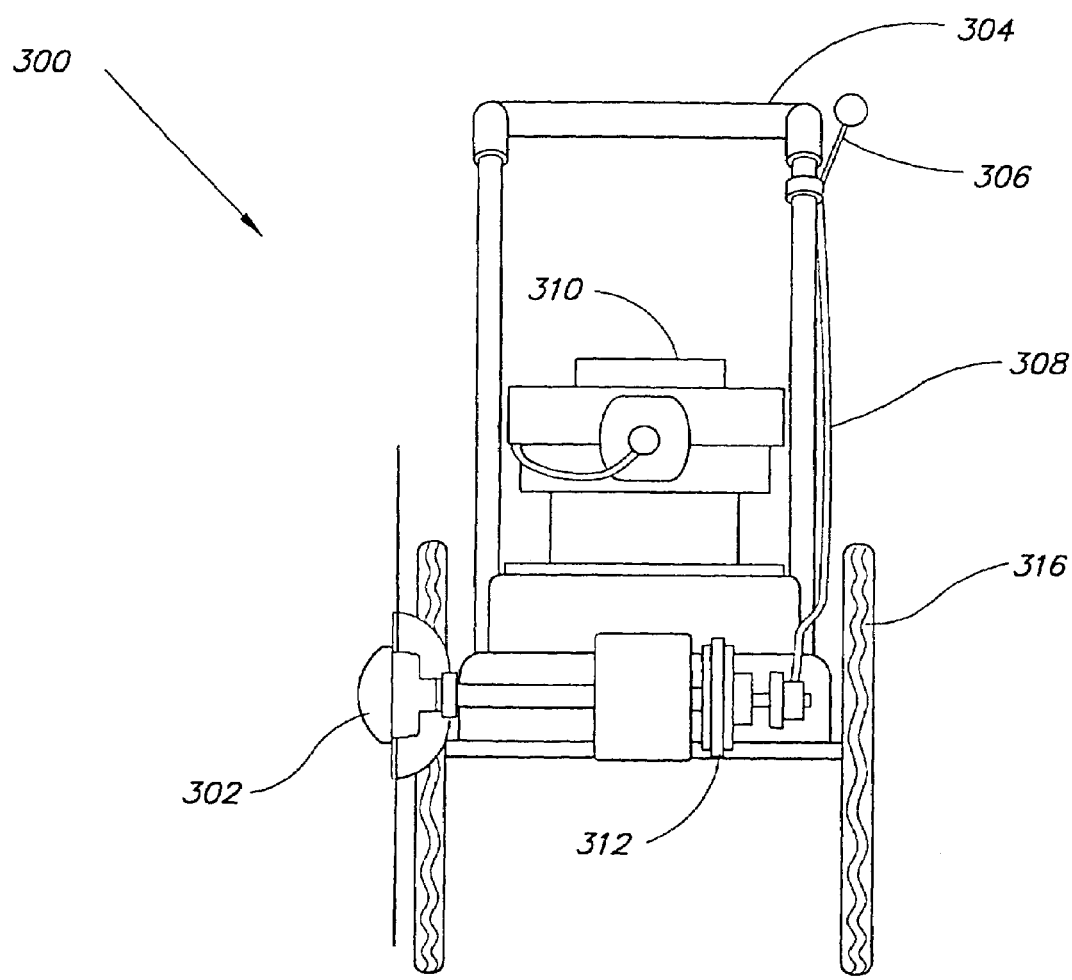
FIG. 17 is a front view of a wheeled weed and grass trimmer configured as an edger and equipped with a weed and grass trimmer line feeder according to the present invention.

FIGS. 16–21 show how the teachings of the present invention may be applied to a wheeled weed and grass trimmer. FIG. 16 shows a wheeled weed and grass trimmer 300 being operated with the cutting head 302 aligned parallel to the ground, while FIG. 17 shows the trimmer 300 with the cutting head 302 configured normal to the ground for use as an edger. The trimmer 300 has an elongated U-shaped handle 304, with a handle lever 306 connected to a cable 308 mounted on the handle 304. The model shown is powered by a gasoline engine 310 which rotates a driveshaft by a belt 312 and pulley 314 arrangement, as is known in the art. The assembly is mounted on wheels 316 for ease in operation.

Figure 18:
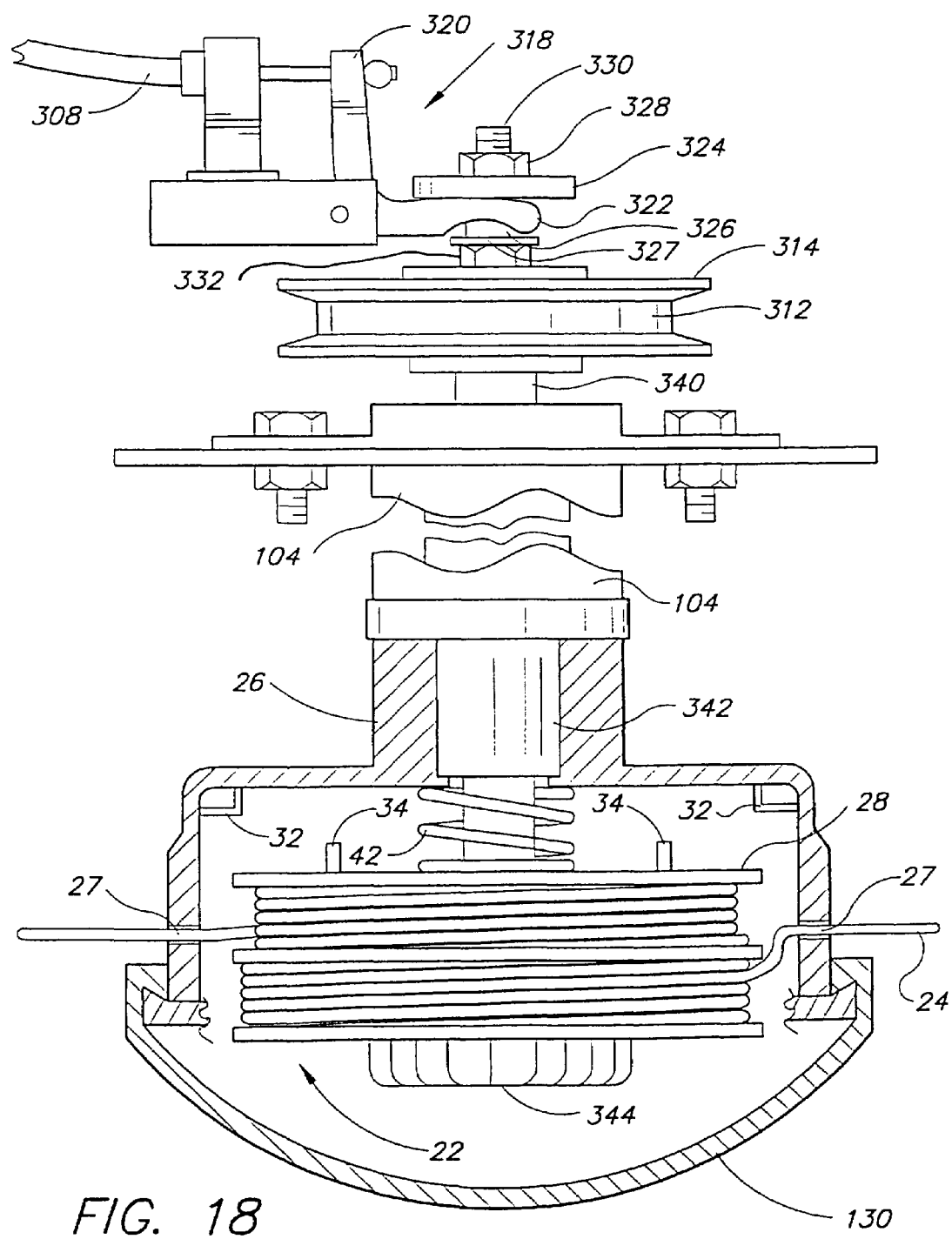
FIG. 18 is a section view of a cutting head with a mechanical line feed for a wheeled weed and grass trimmer according to the present invention with the spool lowered.
Figure 19:
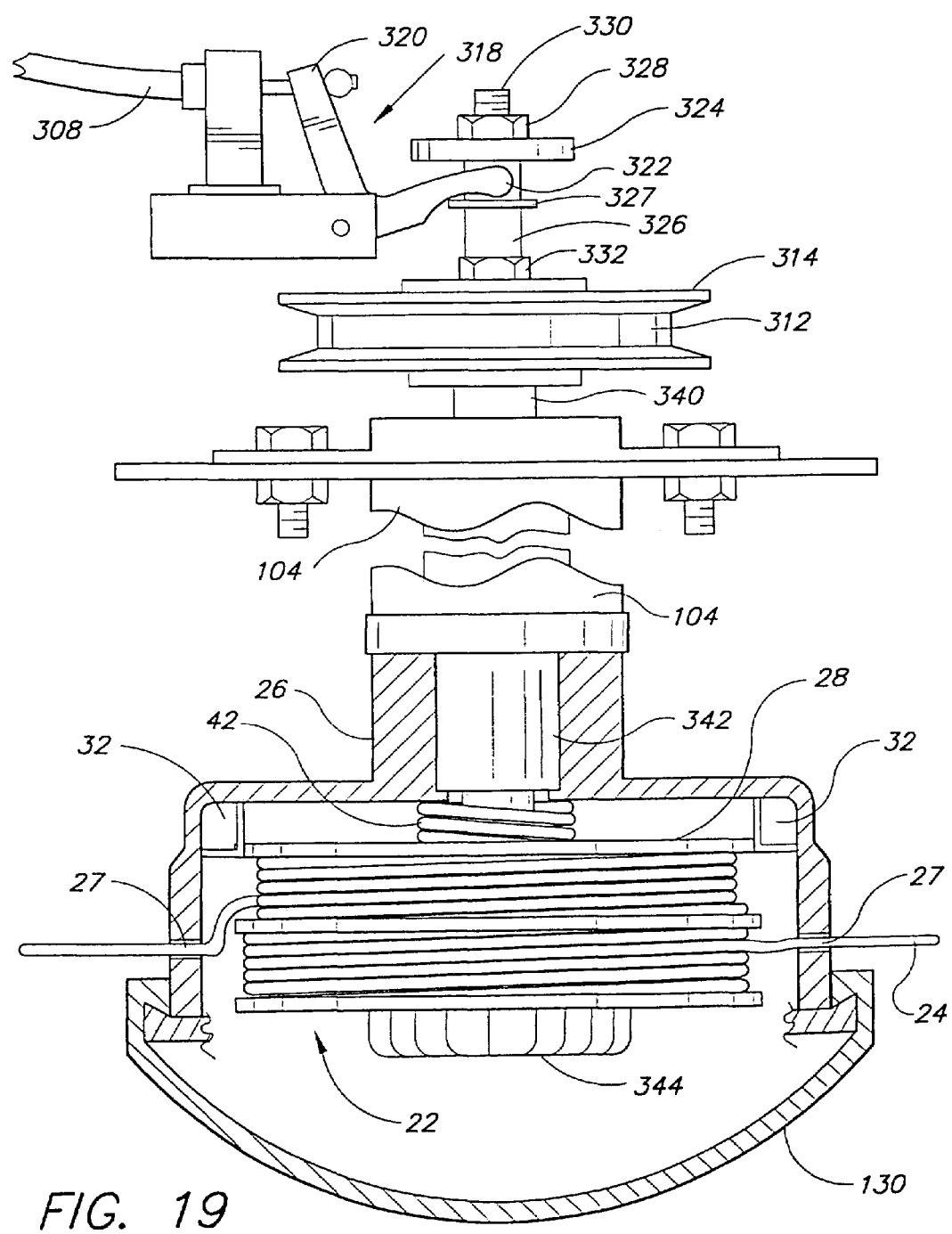
FIG. 19 is a section view of a cutting head with a mechanical line feed for a wheeled weed and grass trimmer according to the present invention with the spool raised.
Figure 21:
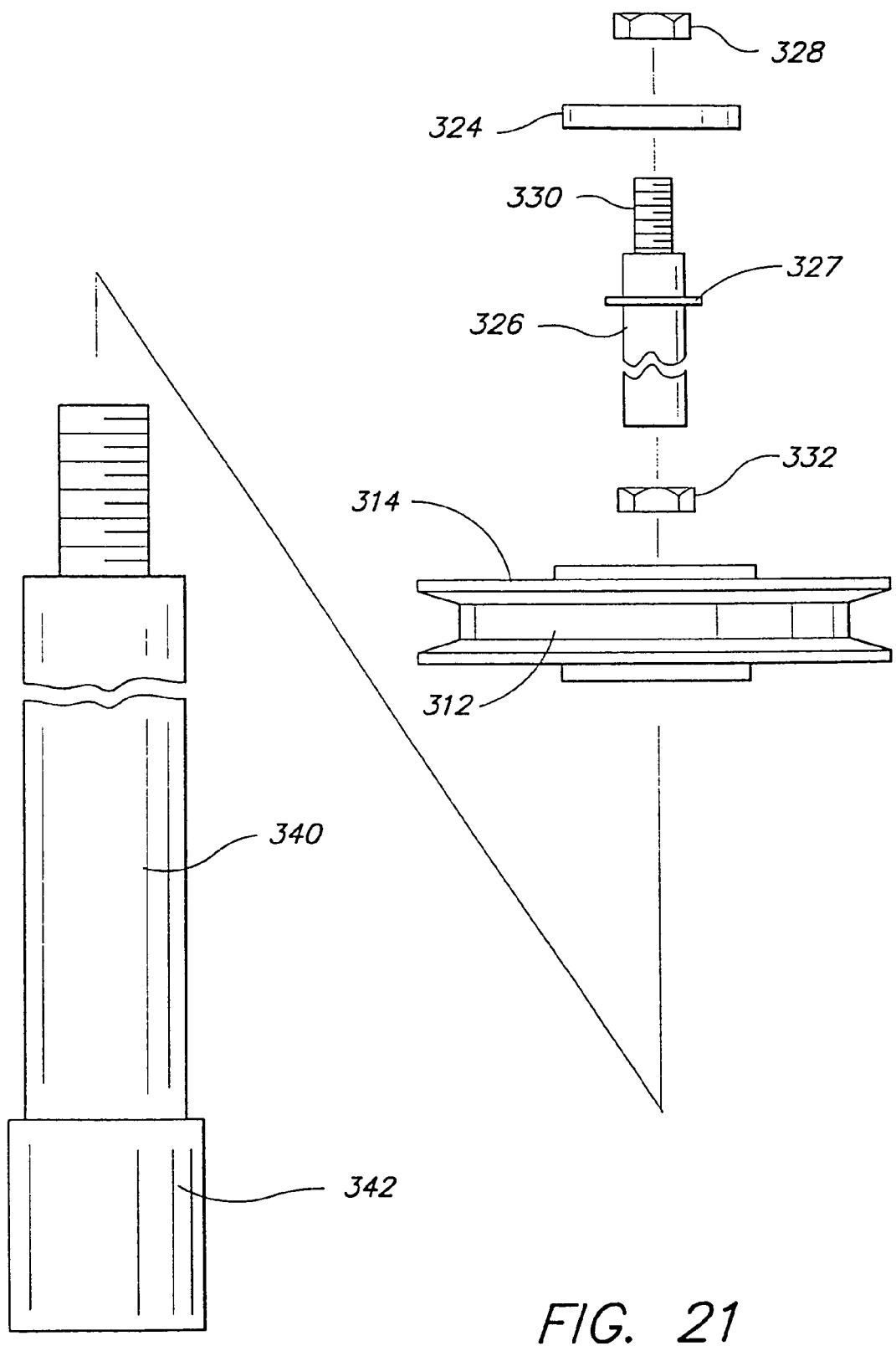
FIG. 21 is an exploded, detail view of a driveshaft assembly for a cutting head of a wheeled gas powered weed and grass trimmer according to the present invention.

FIGS. 18 and 19 show a typical configuration for a mechanically actuated cutting line feed mechanism. The end of cable 308 is secured to the vertical arm 320 of pivotally mounted lever 318. The horizontal arm 322 of the lever 318 is mounted below bearing 324. As shown in FIG. 21, bearing 324 is an annular ring mounted on cylindrical internal shaft 326 and secured by nut 328 attached to threaded upper end 330 of the shaft 326. Pulley 314 is mounted on splines at the upper end of hollow driveshaft 340 and secured by nut 332 attached to threads on the driveshaft 340 above the splines. Internal shaft 326 is inserted into the hollow driveshaft 340 and is slidable inside the driveshaft 340. Internal shaft 326 has an annular flange 327 disposed about its exterior circumference. The horizontal arm 322 of lever 318 may be forked, or it may be broad and have an elongated hole defined therein so that it may be disposed about internal shaft 326 above annular flange 327. When cable 308 is pulled by depressing hand lever 306, horizontal arm 322 pivots upward and bears upon the lower surface of bearing 324, raising internal shaft 326, as shown in FIG. 19.

The hollow driveshaft 340 extends through trimmer housing 104. The lower end of hollow driveshaft 340 is engaged with spool housing 26, e.g., by providing driveshaft 340 with a hexagonal adapter 342 which mates with a hexagonal opening in housing 26 so that housing 26 rotates with driveshaft 340. Spool 22 is mounted on the lower end on internal shaft 326 and secured by knob 344. Bias spring 42 normally biases spool 22 downward, so that flanges 30 on top plate 28 engage lower flanges 34 of the spool housing 22, as shown in FIG. 18, the rotational movement of the housing 26 imparting rotational movement to the spool 22 through engagement of the flanges. When hand lever 306 is pressed, lever 318 raises internal shaft 326, and consequently spool 22, until the flanges 30 engage upper flanges 32, as shown in FIG. 19, a first increment of cutting line 24 being dispensed during the transition by centrifugal force. When the hand lever 306 is released, bias spring 42 is relaxed, pulling internal shaft 326 down until flanges 30 engage lower flanges 34, dispensing a second increment of cutting line during the transition.

Figure 20:
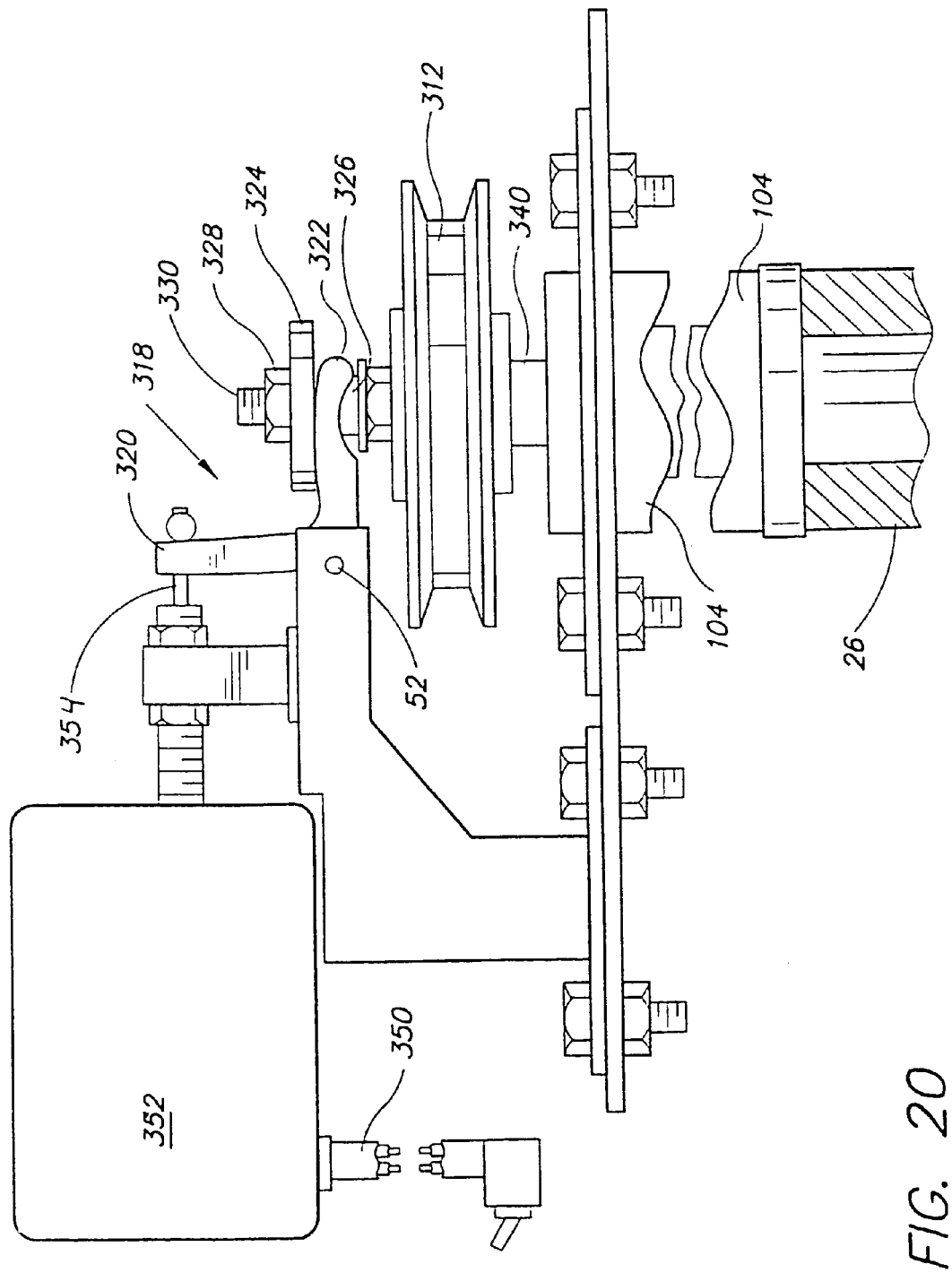
FIG. 20 is a section view of a cutting head with an electrical line feed for a wheeled weed and grass trimmer according to the present invention.

FIG. 20 shows a cutting head 302 for a solenoid activated cutting head for a wheeled weed and grass trimmer 300. In this configuration, an electrical switch (not shown) is mounted on the handle 304 and is connected by wiring 350 to solenoid 352. The solenoid plunger 354 is attached to the vertical arm 320 of lever 318. The remainder of the configuration is identical to that described with reference to FIGS. 18, 19, and 21. In use, the solenoid plunger 354 is normally extended during cutting operation, so that the flanges 30 of spool 22 engage the lower flanges 34 of housing 26. When the electrical switch is activated, plunger 354 is withdrawn into the solenoid coil 352, causing lever 318 to pivot and raise internal shaft 326, raising the spool 22 so that flanges 30 engage upper flanges 32, dispensing a first increment of cutting line 24 during the transition. When the switch is released, plunger 354 extends, bias spring 42 pushing spool 22 downward so that flanges 30 engage lower flanges 34, dispensing a second increment of cutting line 24 during the transition.

It is to be understood that, within any embodiments, the gasoline motor 18 and electric motor 18 are totally interchangeable. Additionally, within any embodiments, the cable 54 and hand lever 56 may interchanged with the solenoid 76. Further, any embodiment may include a spool 22 with or without a replaceable bobbin 66. Lastly, the cover 130 may be used with any cutting head 16.

It is to be understood that the present invention is not limited to the embodiments described above, but encompasses any and all embodiments within the scope of the following claims.

I claim:
1. A line feeder for a weed and grass trimmer, comprising:
   a) a spool for holding a cutting line, the spool having:
      (i) a circular top plate with a plurality of top plate flanges projecting radially from the circumference of the plate spaced apart at a fixed angle, the top plate having a bolt extending from the plate for attachment to a driveshaft, and a cylindrical barrel depending from the plate, the barrel having a bottom face with a cylindrical cavity defined therein, the cavity having a plurality of grooves defined therein;
      (ii) a replaceable bobbin for holding at least one wound coil of the cutting line;
      (iii) a circular bottom plate, said bobbin being disposed between said top plate and said bottom plate, the bottom plate having a knob depending therefrom and an upper face having a cylindrical post arising therefrom, the post having a plurality of tabs projecting therefrom, the cylindrical post being slidably inserted into the cylindrical cavity with the tabs sliding in the grooves defined in the cavity and being locked in the grooves when said knob is rotated in order to temporarily attach said bottom plate to said top plate; and
      (iv) means for interlocking said top plate with said bobbin so that said bobbin rotates with said top plate
   b) a spool housing enclosing said spool, the spool housing being substantially dome-shaped and having an open bottom and at least one hole defined therein for dispensing the cutting line;
   c) a plurality of upper flanges disposed inside said spool housing, the upper flanges being equal in number to the flanges projecting from said top plate and spaced apart at the same fixed angle as said top plate flanges;
   d) a plurality of lower flanges disposed inside said spool housing in a horizontal plane below said upper flanges, the lower flanges being equal in number to the flanges projecting from said top plate and spaced apart at the same fixed angle as said top plate flanges, said lower flanges being rotationally offset by an angle of about one-half the fixed angle separating said upper flanges so that each lower flange is positioned about midway between two of said upper flanges;
   e) a bias spring positioned between the top plate of said spool and said spool housing, the spring normally biasing the top plate flanges of said spool into abutting contact with the lower flanges in said spool housing; and
   f) line feeder means for causing relative movement between the top plate flanges and the lower and upper flanges of said spool housing in order to dispense increments of cutting line from said spool, said means being operable from a handle of a weed and grass trimmer without bumping the trimmer on the ground.

* * * * *